Figure 1:
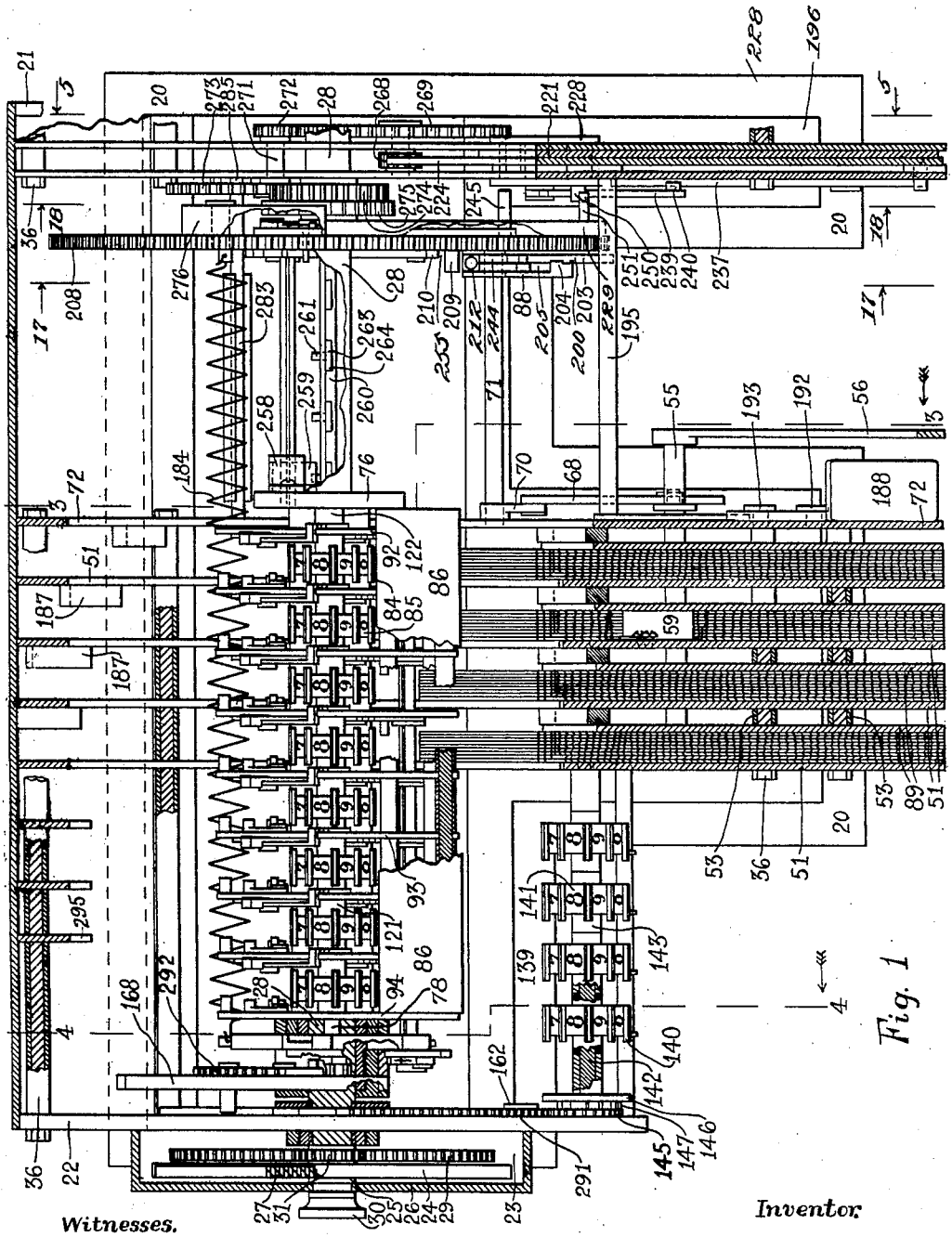

No. 879,449. PATENTED FEB. 18, 1908.
E. S. ENSIGN.
CALCULATING MACHINE.
APPLICATION FILED MAY 3, 1906.

12 SHEETS—SHEET 1.

Witnesses.
Melva W. Polew.
Francis E. Smith

Inventor.
Emory S. Ensign.
By Charles F. A. Smith
Attorney.

No. 879,449. PATENTED FEB. 18, 1908.
E. S. ENSIGN.
CALCULATING MACHINE.
APPLICATION FILED MAY 3, 1906.

12 SHEETS—SHEET 2.

WITNESSES
A. T. Palmer
L. C. Allen

INVENTOR
EMORY S. ENSIGN
BY Charles F. A. Smith
ATTY

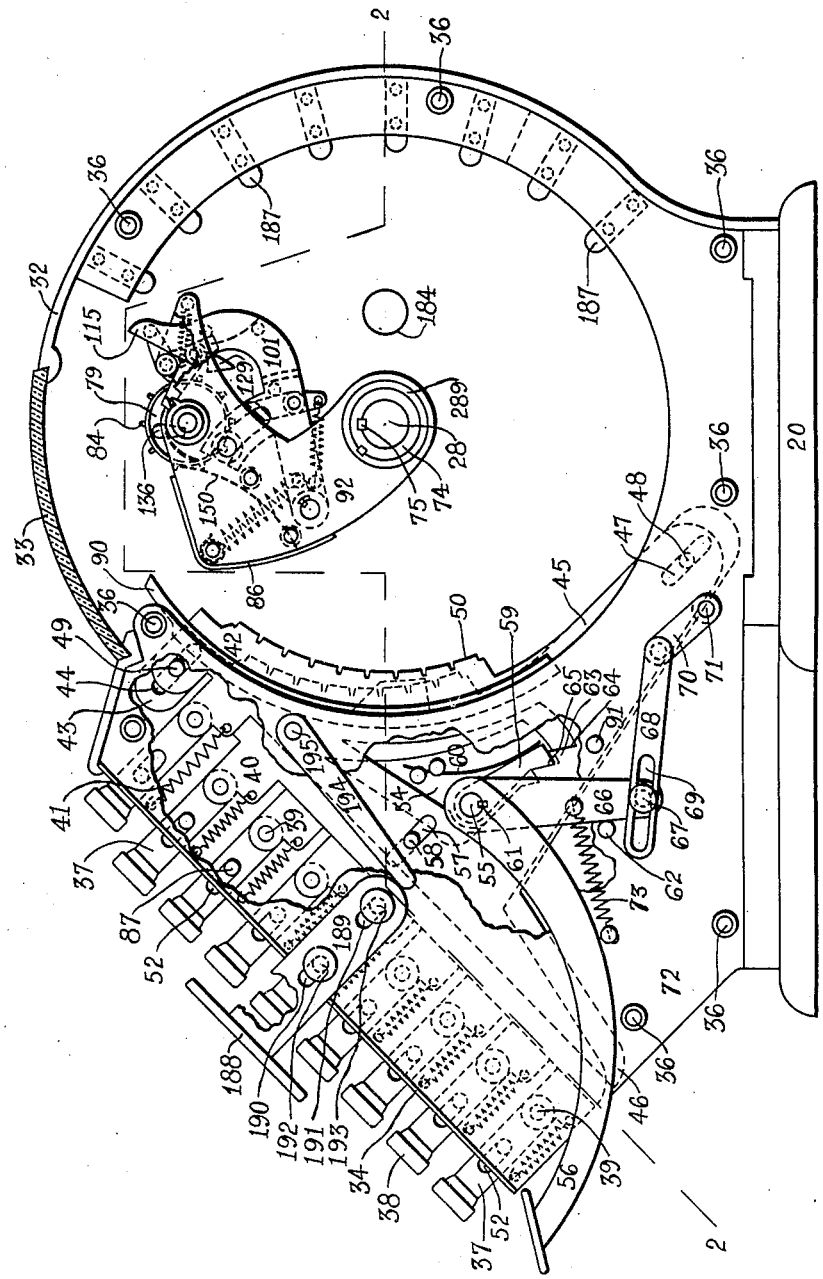

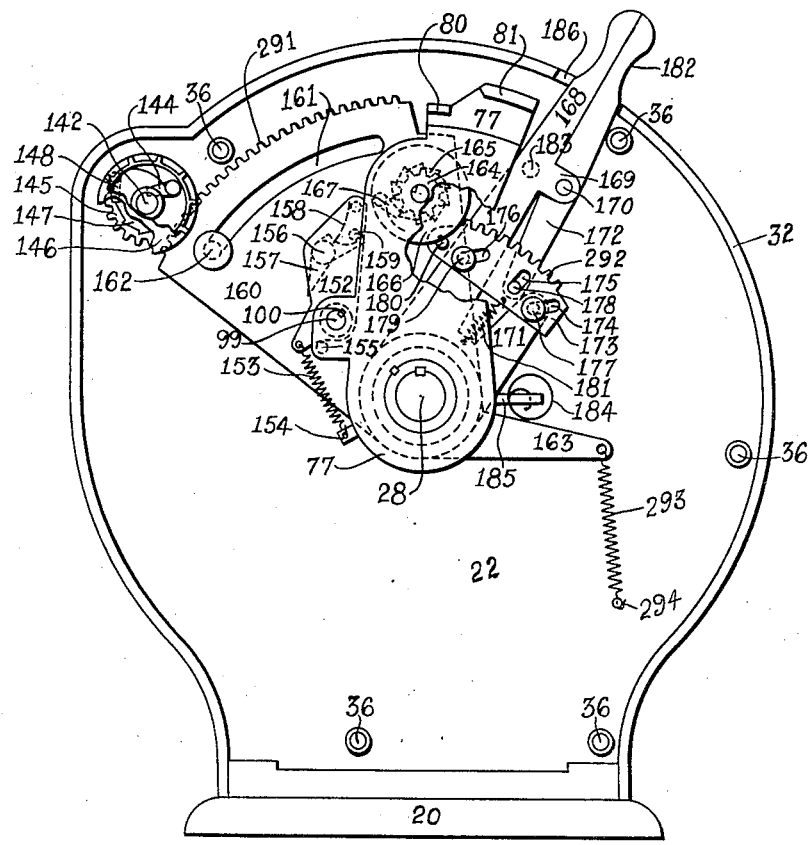

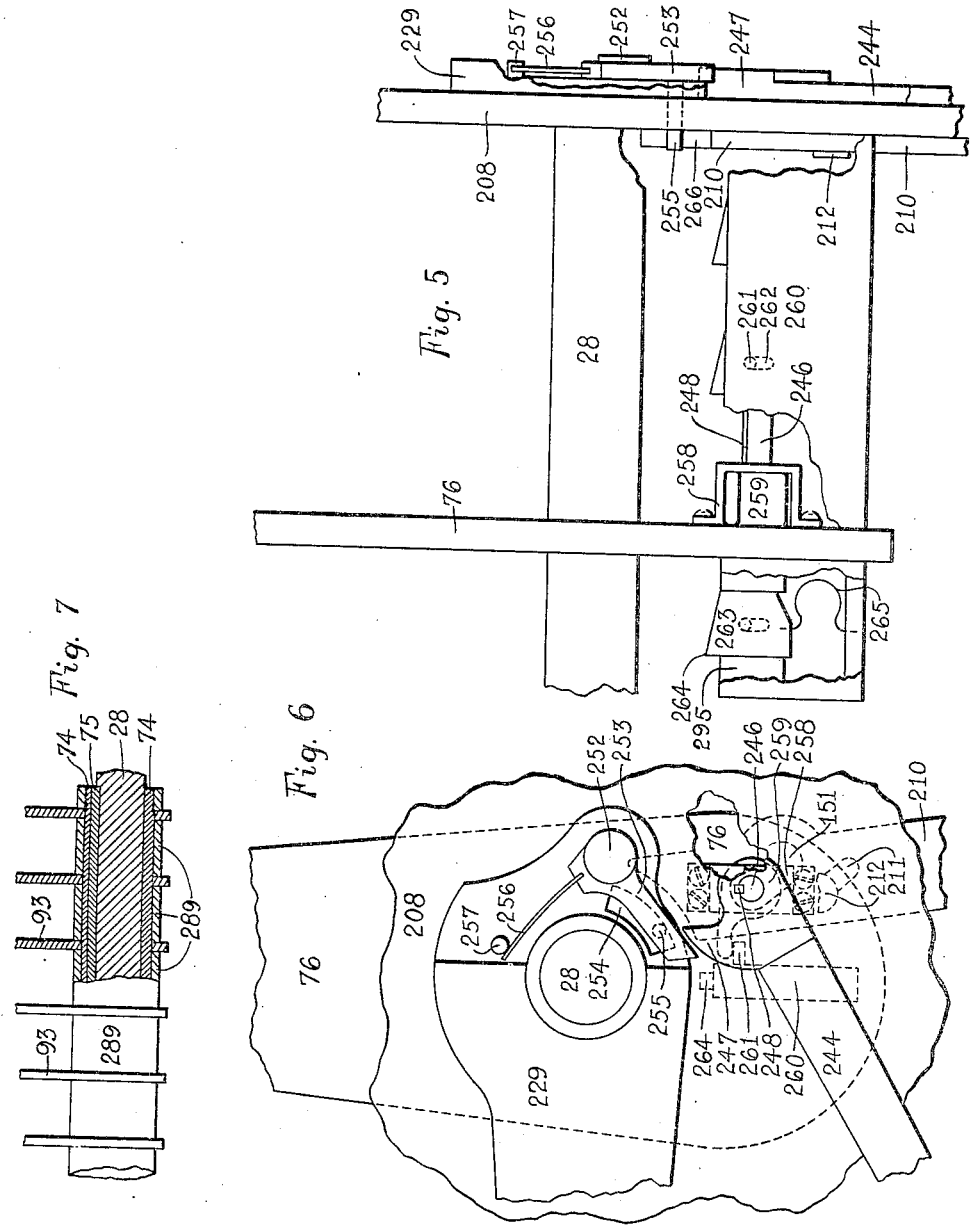

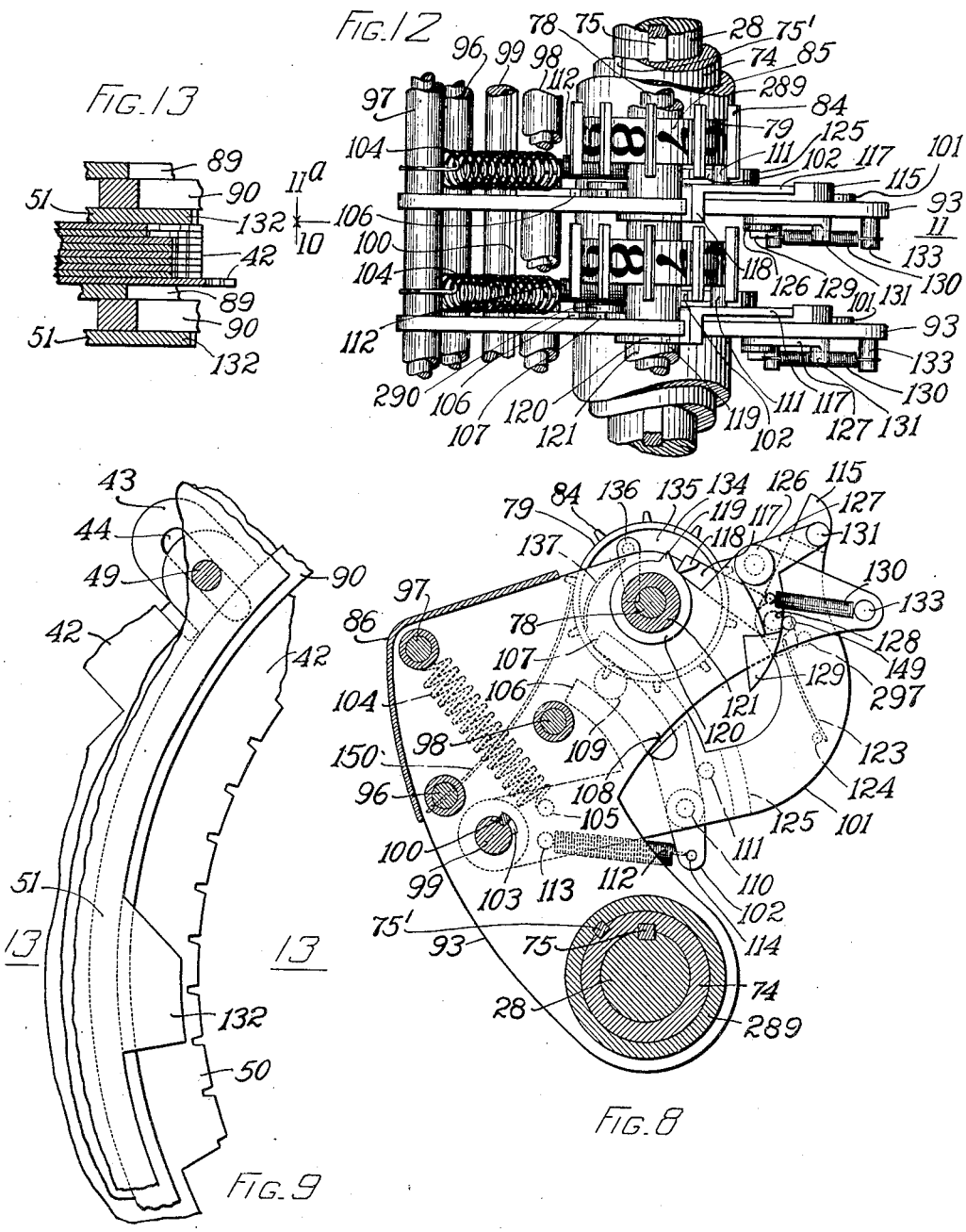

No. 879,449.　　　　　　　　　　　　　　　PATENTED FEB. 18, 1908.
E. S. ENSIGN.
CALCULATING MACHINE.
APPLICATION FILED MAY 3, 1906.
12 SHEETS—SHEET 7.
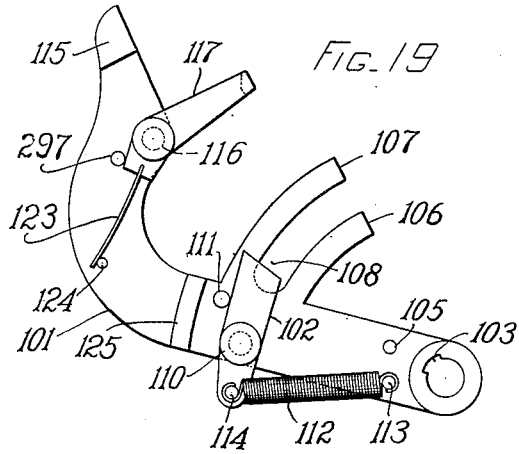
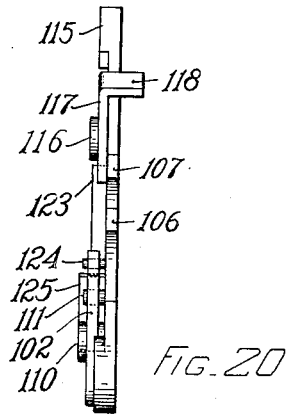
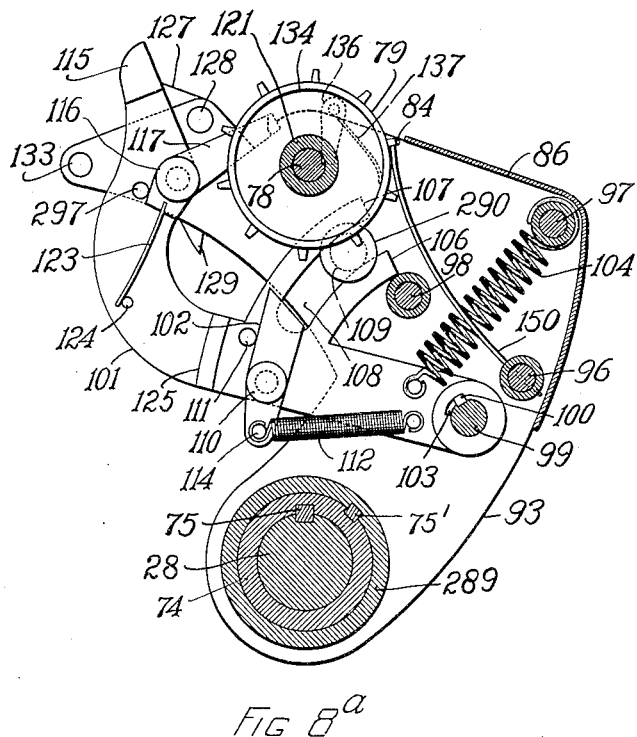
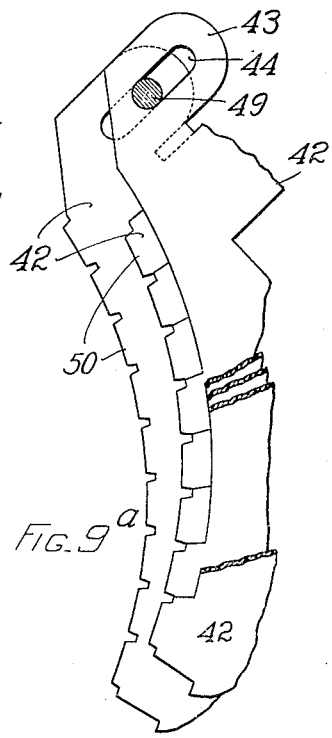
WITNESSES
A. T. Palmer
L. E. Allen
INVENTOR
EMORY S. ENSIGN
By Charles F. A. Smith
ATT'Y

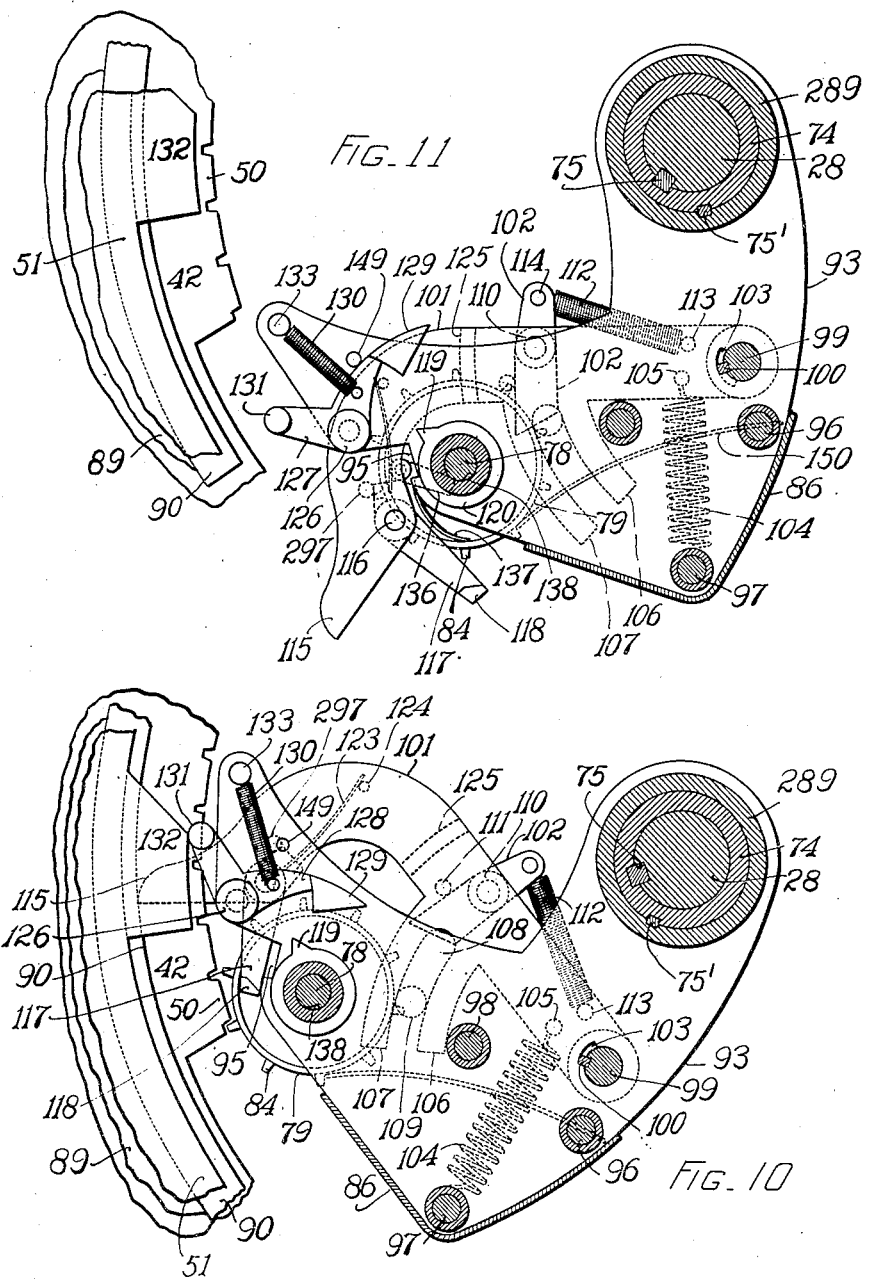

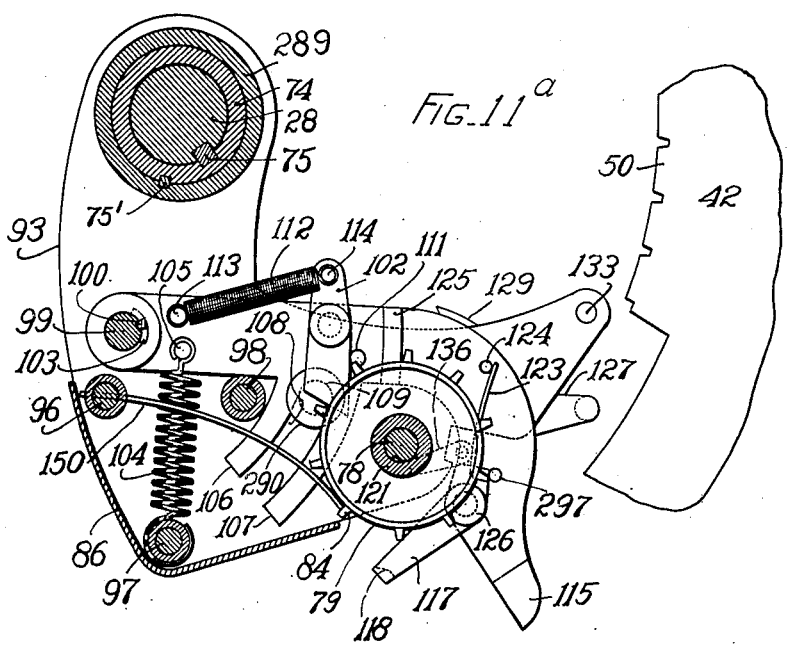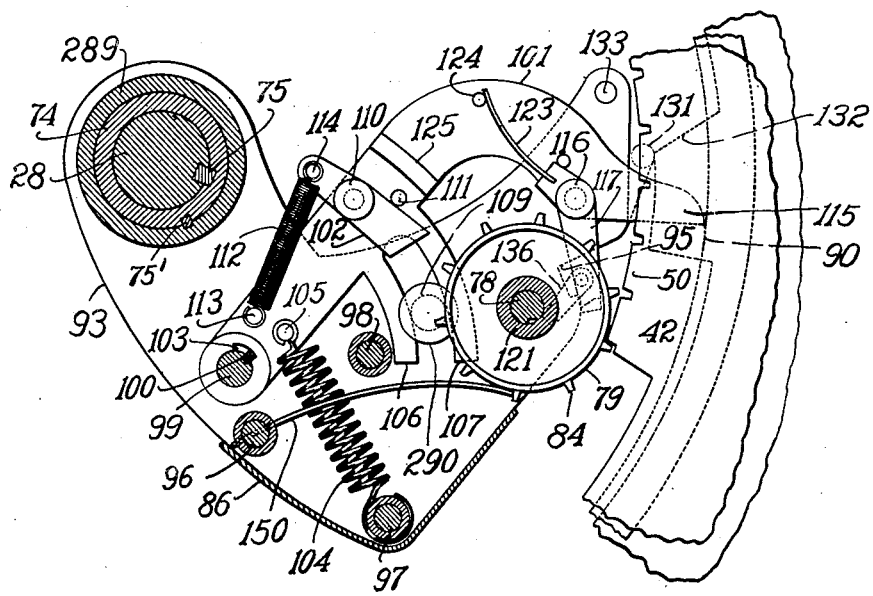

No. 879,449.

E. S. ENSIGN.
CALCULATING MACHINE.
APPLICATION FILED MAY 3, 1906.

PATENTED FEB. 18, 1908.

12 SHEETS—SHEET 10.

Witnesses.

Inventor.
Emory S. Ensign.
By Charles F. A. Smith
Attorney.

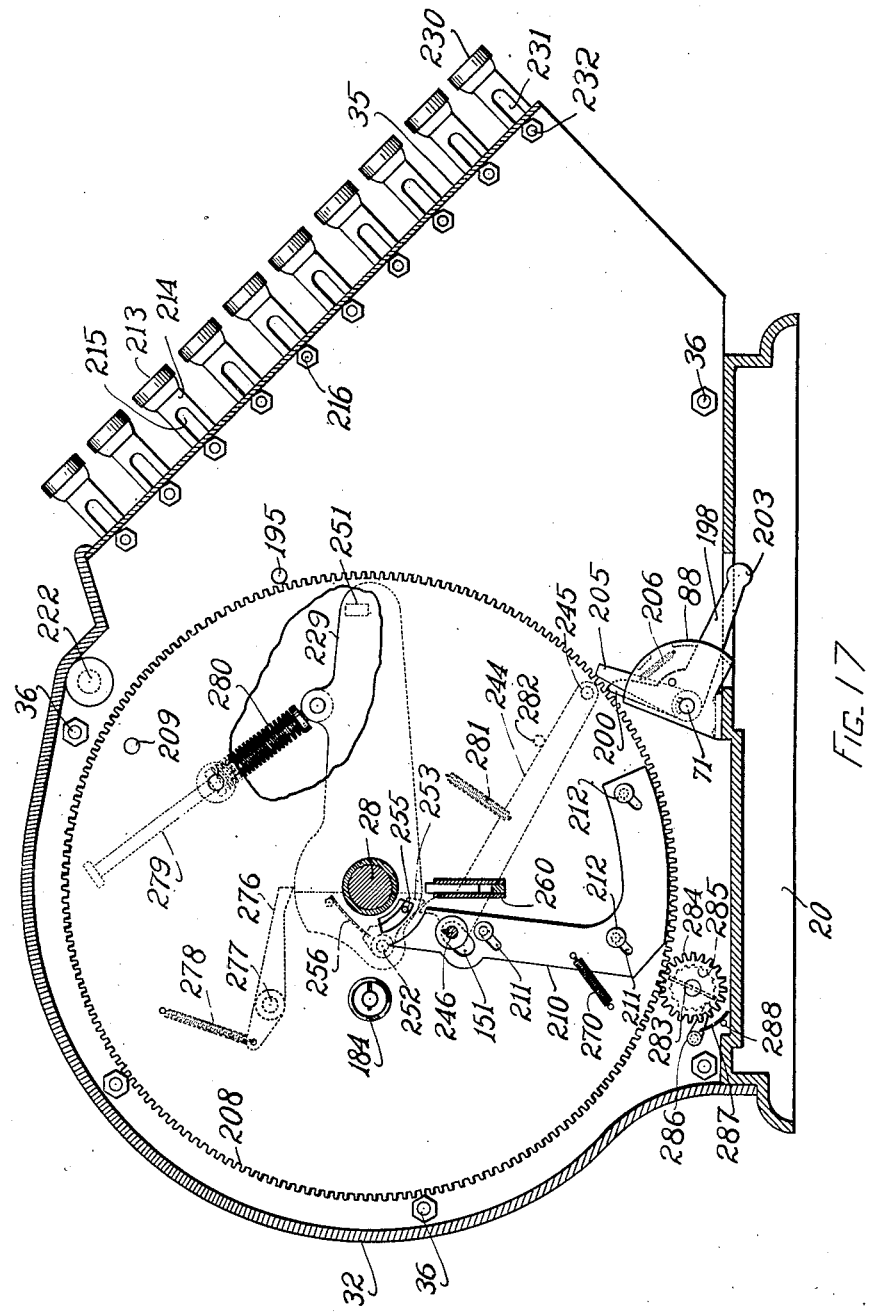

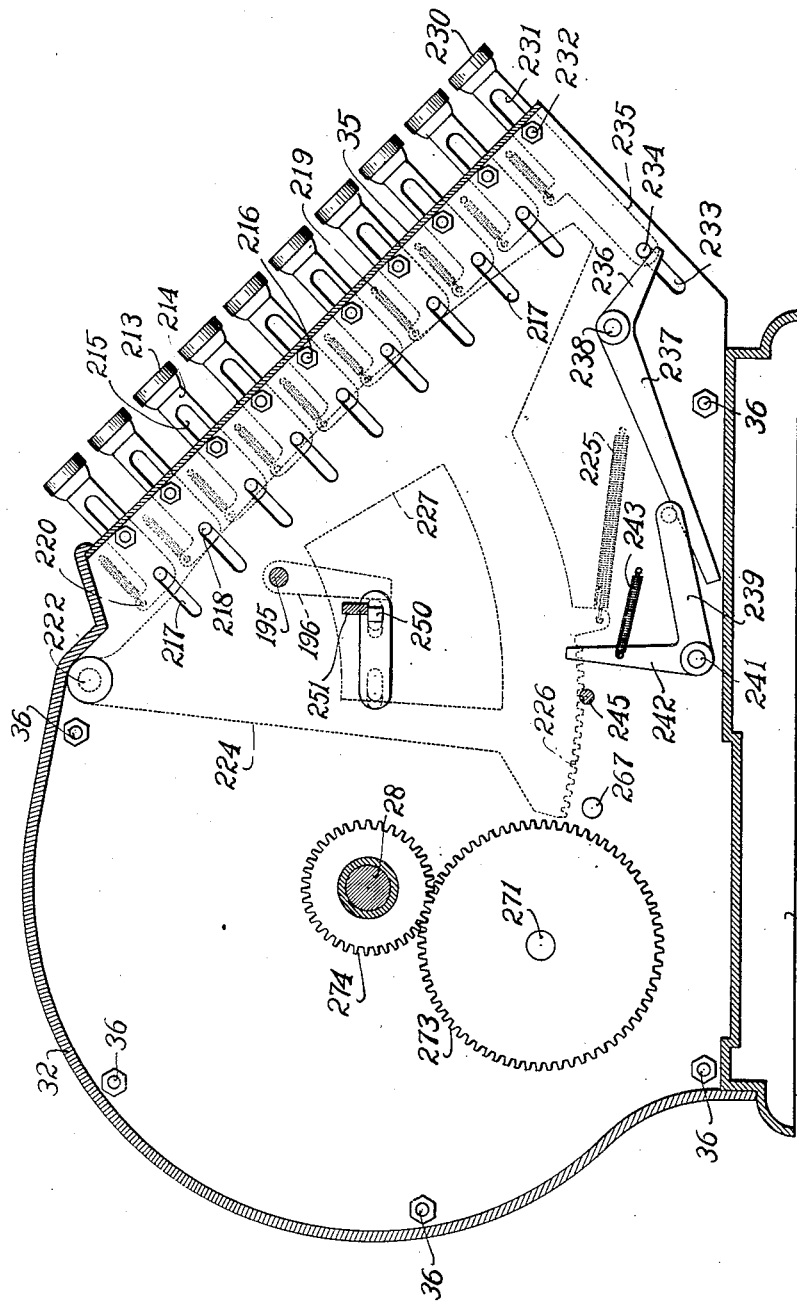

UNITED STATES PATENT OFFICE.

EMORY S. ENSIGN, OF NEWTONVILLE, MASSACHUSETTS, ASSIGNOR TO ENSIGN MANUFACTURING COMPANY, OF BOSTON, MASSACHUSETTS, A CORPORATION OF MASSACHUSETTS.

CALCULATING-MACHINE.

No. 879,449.  Specification of Letters Patent.  Patented Feb. 18, 1908.

Application filed May 3, 1906. Serial No. 315,021.

*To all whom it may concern:*

Be it known that I, EMORY S. ENSIGN, a citizen of the United States, residing at Newtonville, in the county of Middlesex and State of Massachusetts, have invented certain new and useful Improvements in Calculating-Machines, of which the following is a specification, reference being had therein to the accompanying drawings.

My invention relates to certain improvements in calculating-machines, particularly of that type shown in my United States Letters Patents numbered 773,632 dated November 1st, 1904, and 809,047 dated January 2nd, 1906, adapted to the performance of multiplication and other arithmetical processes and has for its main object the obtaining upon a meter the product in multiplication in a more certain and perfect manner and with greater rapidity than has heretofore been done.

One object of the invention is to provide an improved multiplication machine, of comparably few operating parts, which will be simplicity itself in operation so that its operation may be quickly acquired.

To this end my invention consists, first, in novel means for transmitting the movement of the "primary" or adding keys to the indicating mechanism, whereby all the keys may receive precisely the same degree of downward movement without regard to the values which they represent, while the effective movement transmitted to the indicating mechanism will be proportioned to the value represented by each key; second, in novel means for allowing of the instant returning of the "primary" or adding keys to their normal positions by a single operating-lever after the indicating devices have been moved to the desired positions in any of the various arithmetical problems; third, in novel means for automatically returning the "primary" or adding keys to their normal positions in problems of addition as soon as the meter has been operated by the depressed keys; fourth, in novel means for holding each of the depressed toothed segments, displaced out of normal position by the pressure down upon its respective "primary" or finger key, in driving contact to be met by the meter, when it is revolved with the driving-shaft, and operated by the teeth of the depressed segments; fifth, in novel means for transmitting the movement of the "secondary" or multiplying keys to the indicating mechanism, whereby all of these keys may receive precisely the same degree of downward movement without regard to the values which they represent while the multiplicand represented by the depressed "primary" or adding keys may be quickly and accurately multiplied by any one of the depressed "secondary" or multiplying keys and the product shown on the meter; sixth, in novel means for automatically returning each of the depressed "secondary" or multiplying keys to their normal position as the meter is operated by contact with the toothed segments; seventh, in novel means for automatically shifting the meter, in problems of multiplication and division immediately after the meter has been operated according to the depressed "primary" keys and the depressed "secondary" key, one position to the right so that the next operation of depressing a "secondary" key will cause a multiplication to be made which would be ten times greater in each case than it would have been had the meter not been shifted; eighth, in novel means for automatically shifting the meter to the right, without revolving it or its driving-shaft, when one or more "naughts" appear in the multiplier; ninth, in novel means for resetting the meter backward from right to left to its normal position; tenth, in novel means for showing upon an indicator (or secondary meter) the number of revolutions the meter has been caused to make by the turning of its driving-shaft, and in multiplication showing the multiplier, i. e., the depressed "secondary" keys and the position of the meter when each of the keys was depressed; eleventh, in novel means for simultaneously operating all of the wheels of the meter to be operated by the depressed toothed segments upon each revolution of the driving-shaft; twelfth, in novel means for preventing over-rotation of the meter-wheels when they are operated by contact with the toothed segments; thirteenth, in novel carry-up mechanism; fourteenth, in novel means for preventing over-rotation when the carry-up mechanism is operated; fifteenth, in novel means for instantly and simultaneously resetting the meter and indicator to their normal or zero position; sixteenth, in novel means for revolving the meter independently of the "secondary" or multiplying keys, for use in problems of addition and subtraction.

It consists further, in the legitimate combinations of the features referred to with each other and with other features not yet alluded to, and in numerous other subordinate but important combinations, and also in certain specific features of construction, all of which will be fully described hereinafter.

Figure 2:
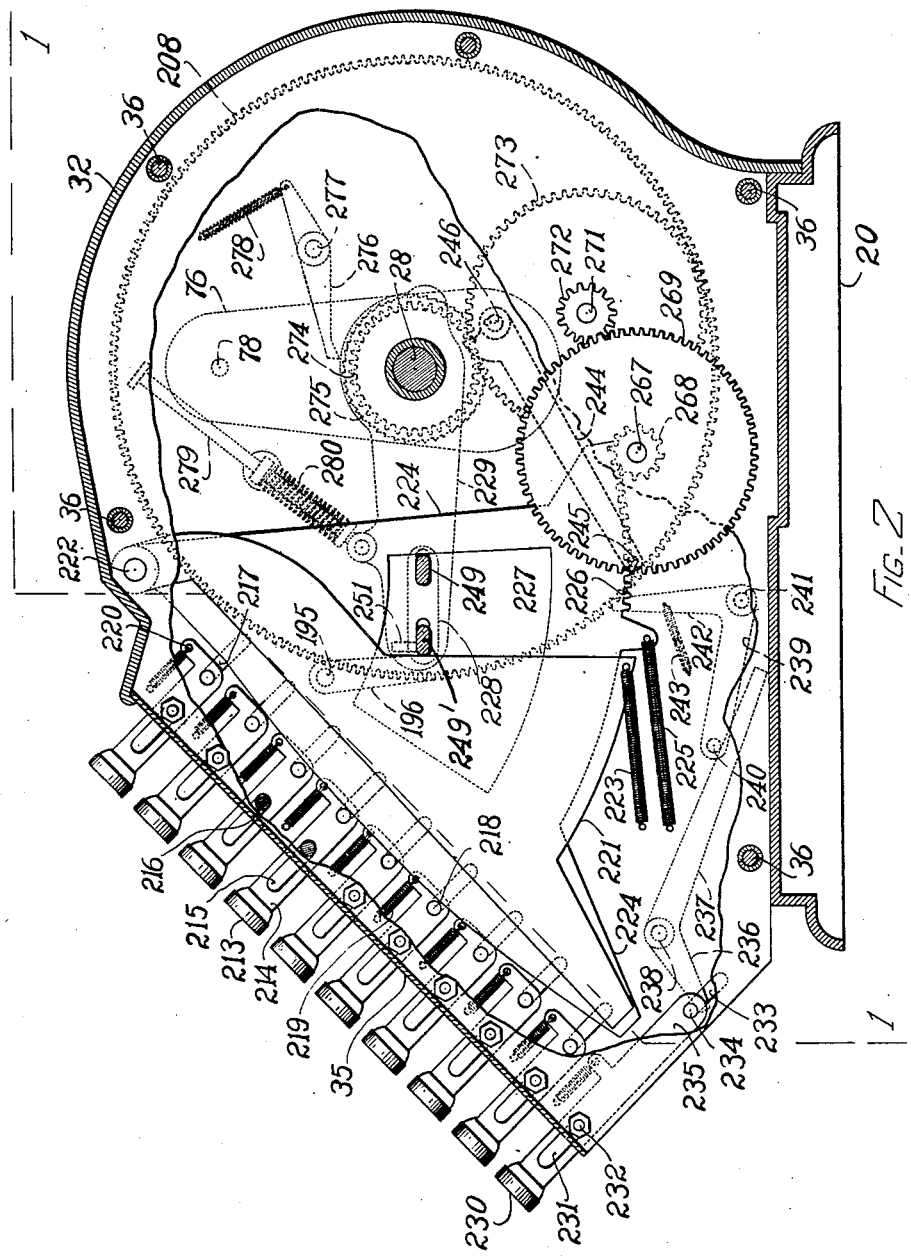
Figure 14:
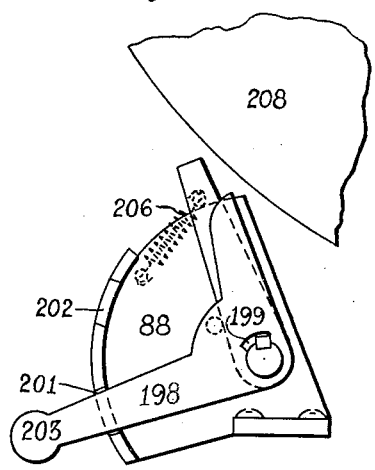
Figure 15:
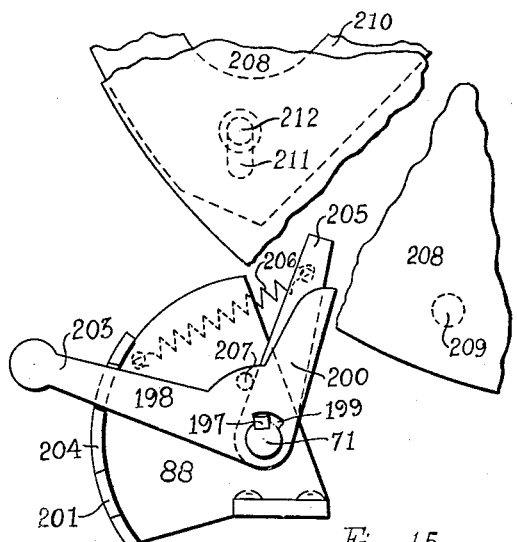
Figure 16:
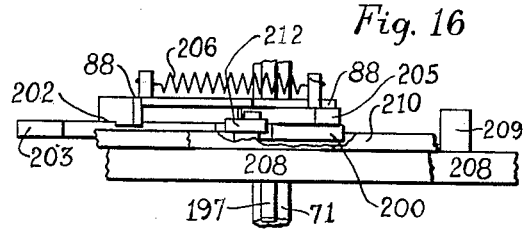

In the accompanying drawings, Figure 1 is a plan view of a calculating-machine constructed in accordance with my invention, with the casing removed; the multiplying mechanism being taken on the line 1—1 of Fig. 2, and the remainder of the machine on the line 2—2 of Fig. 3. Fig. 2 is a cross-sectional elevation on line 5—5 of Fig. 1, and showing the "secondary" or multiplying keys. Fig. 3 is a side elevation on the line 3—3 of Fig. 1 in the direction indicated by the arrow, but showing only that portion of the machine between the lines 3—3 and 4—4 of Fig. 1. Fig. 4 is a side elevation on the line 4—4 of Fig. 1 in the direction of the arrow. Figs. 5, 6 and 7 are enlarged detail views of parts of the machine. Fig. 8 is a vertical section of Fig. 12 taken on line 10—11 and showing the position of the parts before the meter wheels have met and been operated by the toothed segments shown in Fig. 9. Fig. 8$^a$ is a sectional view on line 10—11 of Fig. 12 looking in the direction of arrow 11$^a$, and showing the parts positioned as in Fig. 8. Fig. 9 is a side elevation of a portion of the toothed operating segments; the meter wheels are shown as having been operated, the numerals "9" showing upon the reading line. Fig. 9$^a$ is a sectional view on the same line of Fig. 13 looking as per arrow 11$^a$. Fig. 10 is a view of the same parts shown in Fig. 8 but showing the meter as having been further operated by the teeth of the segments and its wheels stopped in their movement by the tongues of the over-rotation pawls. Fig. 10$^a$ is a sectional view on line 10—11 of Fig. 12, looking in the direction of arrow 11$^a$ and showing the parts positioned as in Fig. 10. Fig. 11 shows the same parts in the next movement, after the over-rotation pawls have been withdrawn from contact with the teeth of the wheels of the meter. Fig. 11$^a$ is a sectional view on line 10—11 of Fig. 12, looking in the direction of arrow 11$^a$ and showing the parts positioned as in Fig. 11. Fig. 12 is a plan view of a part of the meter. Fig. 13 is a cross-sectional view on the line 13—13 of Fig. 9. Fig. 14 is a detail view of part of the mechanism for automatically releasing the adding-keys, showing the mechanism out of contact. Fig. 15 is another view of the same parts showing the same in position for operation. Fig. 16 is a plan view of the parts shown in Fig. 15. Fig. 17 is a cross-sectional elevation on line 17—17 of Fig. 1. Fig. 18 is a cross-sectional elevation on line 18—18 of Fig. 1. Fig. 19 is a left end elevation of one of the carry-up arms 101 and the parts carried by it. Fig. 20 is a front elevation of the same.

Latitude is allowed herein as to details, as they may be changed or varied at will without departing from the spirit of my invention and the same yet remain intact and be protected.

Corresponding and like parts are referred to in the following description and indicated in all the views of the drawings by the same reference characters.

In order that the construction and operation of my improved machine may be the more readily comprehended, I shall endeavor, whenever practicable, to connect the description of the two, my general method being to preface the description of the mechanism with a statement of the end to be accomplished thereby.

The description of the various mechanisms will be given in order of their operation in the machine.

*The framework and main driving mechanism.*—Referring to the drawings, 20, Figs. 1, 2, and 3, represent the base-plate or main bed of the machine. The framework is constructed in any suitable form and manner, and I preferably use on each end of the machine an end side or wall, the side to the right being numbered 21 and the side to the left 22 and between which are placed all the operating parts of the machine with the exception of parts of the driving mechanism which are inclosed in a box 23 attached to the outer side of the side 22, (see Fig. 1).

In the box 23 at the left end is arranged a spring-drum 24, journaled on a shaft 25, which has its bearings in the side 22 of the main casing and side 26 of the box. Arranged within the drums 24 for revolving the driving-shaft 28 in one direction is a spiral spring 27, having one end secured to the inner circular wall of the drum 24 and its other end secured to the shaft 25, but I have not illustrated this spiral spring's connection with the drum nor the ratchet and pawl used in connection with it, by which the spring can be wound or tightened up without turning the gear 29, as the use of the same is quite common in calculating-machines, and any other kind of a spring, giving driving power to the drum, whether electrically wound or otherwise, may be used if desired. On the outer side of the side 26 of the box 23 the shaft 25 carries a knob 30 for rewinding the spring 27 within the drum.

The driving-shaft 28 is journaled in the end sides 21 and 22 and is the driving-shaft for the meter, the meter not being operated, as in most calculating-machines, by the downward or upward movement of the "primary" or adding keys. The driving-shaft 28 extends beyond the end side 22 and partly into the box 23 above the gear 29, as is clearly illustrated in my former patents, and carries on its outer end a pinion 31, having its teeth in mesh with the gear 29, so that the shaft 28 receives driving power and is revolved, with the meter, around the inner side of the toothed segments, as hereinafter described.

The rear of the framework is semicircular, extending upward in the shape of a hood 32, as clearly shown in Figs. 2, 3, and 4, and will be hereinafter called the "hood".

The multiplying mechanism is situated in the right end portion of the machine, as shown in Figs. 1, 2, 17 and 18, and is nearly covered by the hood. The adding mechanism is situated about midway of the machine, as shown in Figs. 1 and 3, and is nearly covered by the hood but a sight-orifice 33, preferably in the form of a convexed glass lid, is provided for permitting the figures upon the meter and indicator to be read. This sight-orifice extends from about the left end of the multiplying mechanism to the extreme left end of the indicator so that all of the numeral wheels of the indicator and all the numeral wheels of the meter, even when the meter has been shifted to the extreme right, may be read.

By examining Figs. 1, 2, 3, 17 and 18 it will be noticed that the base 20 is extended quite a distance forward at the right end of the machine to allow for the multiplying mechanism, and is also extended forward below the adding mechanism, and that suitable frameworks 34 and 35 cover the greater portion of the front part of the multiplying and adding mechanisms respectively.

Tie-rods 36 are used quite extensively throughout the machine to hold different sections of the machine and the two end sides of the machine together so that parts of the machine can be readily separated and adjusted or repaired if necessary.

*"Primary" or adding keys mechanism.*—My improved machine is so constructed that the finger pieces of the "primary" or adding keys 38, which keys for convenience will be hereinafter called the "adding keys," are all at a uniform angle of about 45°, and each of the adding keys should receive precisely the same degree of downward movement without regard to the values which they represent.

The adding keys and their toothed segments comprise in general a number of series of parallel segments 42, each series having nine segments, and I have shown in my drawings four series which are parallel to one another, although the machine may be built with any number of series, without increasing it in size except lengthening the machine sufficiently to allow for the inserting of the extra series of segments and the desired extra number of meter and indicator wheels and other necessary parts to correspond, so that it could add any number of columns or multiply figures of any amount. By using parallel series of segments I can have any number of series of adding keys, while in a machine as shown in my prior patents the number of series is limited according to the diameter of the toothed disks and the diameter of the meter wheels.

The series of segments commencing at the right, as shown in Fig. 1, are units, tens, hundreds, and thousands, and commencing at the bottom of each series of nine adding keys and going towards the top, the keys are numbered respectively, "1", "2", "3", "4", "5", "6", "7", "8", "9". It will be noticed that this numbering is the reverse of the numbering in my former above-mentioned patents.

Each set or series of segments 42 consists of nine separate and independent segments and each set is incased or held between two side plates 51 and 89; the side plates on the left of each series of segments being numbered 51, and those on the right 89, and there is also provided a side plate or frame 72 on the extreme right of the right side plate 89 of the units segments. These side plates 51 and 89 of each series are separated by the spacers 53 on the tie-rods 36. The series of segments on the right, which are the unit-segments, are operated by the right row of the adding keys and these keys are used in all of the arithmetical problems and offer but little resistance to the depressive movement in order not to tax the strength of the operator, and each key, without respect to the value represented receives the same degree of downward movement. These segments have on their inner edge one or more lugs or teeth 50 (see Figs. 1 and 3). For example, the segment of key 1 of each series is provided with one tooth, the segment of key 2 of each series with two teeth, the segment of key 3 of each series with three teeth, and so on, and it will be noticed, by examining Fig. 3, that the segment of key 9 of the units series, which key is depressed, is provided with nine teeth, and that this toothed segment of nine teeth has been displaced out of normal position by the pressure down upon the finger piece, and is in driving contact to be met by the meter when it is revolved with the driving-shaft 28, which meter is arranged to be revolved around the inner side of the machine and to be operated by the teeth of the displaced segments.

The segment on the extreme left of each series is the segment that has one tooth, which tooth is near the lower inner end of the segment, and is operated by the respective key of that series which bears the numeral "1", and this tooth is parallel to the tooth on each of the segments on the extreme left of each series which is operated by a key bearing the numeral "1"; the next segment to the right has two teeth, the second tooth being parallel to the tooth on the first segment; the next segment to the right has three teeth, the third tooth being parallel to the tooth on the first segment and its second tooth being parallel to the first tooth on the second segment; the next segment to the right has four teeth, and so on, so that the segment on the extreme right of each series, which is the ninth segment, has nine teeth, the first tooth being above any of the other teeth on the other segments of the same series and the ninth tooth being parallel to the tooth of the first segment and to the lower tooth of each of the other segments. It is thus seen that the lower teeth of all of the segments of all of the series are parallel to each other so that each of the meter wheels leave the teeth of the segments simultaneously.

The shanks 37 of the adding keys 38 may if desired be made integral with the segments, but I preferably make the same of separate parts and connect by a pin, rivet or other means 39, the lower portion of each shank with a backward extending lip 40 of its corresponding segment, and to the lip is connected a spiral spring 41 fastened at its other end to the inner side of the framework 34, which spring is distended when the segment is displaced and returns the segment and its corresponding key to initial position when the segment is released, as hereinafter explained, after the meter has come in contact with its teeth the desired number of times. Each of the shanks 37 is provided with a slot 52 through which passes a guide pin 87. The segments are also provided with the backward extending arms or lips 43 at their upper ends, each of which is provided with a slot 44 through which the retaining or guide pin 49 passes. Each segment is extended downward in two parts as at 45 and 46, the portion 45 being provided with the elongated slot 47 through which passes the guide pin 48. The segments may also be provided with the elongated slots 57 through which the guide pins 58 pass. The slots 44, 47, and 57 are all similar and of the same length. When the toothed segments and adding keys and their shanks are shaped as shown in Fig. 3, and as just described, the alinement of the teeth of the segments will be true to be meshed with the teeth of the corresponding meter wheels when the meter is revolved with its driving-shaft 28 around the inner side of the segments.

*Mechanism for allowing of the return of the* *adding mechanism.*—The segments 42 are provided near their central portion with the openings 54; the openings in all of the segments being uniform and preferably of a shape similar to that shown in Fig. 3. A shaft 55, operated by a lever 56 without the framework, (see Figs. 1 and 3) extends through the side plate 72, all of the side plates 57 and 89, and the openings 54 being journaled in the plate 72 at the extreme right of the segments and in the plate 51 at the extreme left of the segments. Mounted upon this shaft 55, and one for each series of segments, are the pawls 59 held in a downward position within the openings 54 and against the lower edges of the openings by the flat springs 60 which springs also keep the lever 56 in its uppermost or normal position. Each of these springs are attached to its corresponding side plate 51 as shown in Fig. 1 in the broken away portion of the tens' segments.

The openings 54 are cut into the segments 42 in such a manner as to form on each segment a tooth 63 and indentations 64 and 65. The pawl 59 of each series of segments normally fitting into the lower indentation 64 but as each segment is displaced, the pawl is thrown into the upper indentation 65, and presses down, by pressure of the spring 60, against the upper face of the tooth 63 keeping the teeth 50 of the segment 42 in a rigid and firm position to be met by a wheel of the meter, until released as herein explained. In order that the lever 56 may not be slightly moved every time a segment is displaced, I allow each of the pawls to have free movement upon the shaft 55 but limit this movement by the keys 61 in the shaft 55 moving in a keyway (not shown), there being one key for each series of segments. It is therefore readily seen that I can by pressure down upon the lever 56 instantly and simultaneously reset all of the segments and their respective adding keys or I can reset to its normal position any segment and its corresponding key by the displacement of any other segment of the same series; this latter being of great benefit in addition and other problems to instantly correct the machine when a wrong adding key has been pressed, and a correction can thus be made on my machine because the pressing of the adding key does not affect the meter until the meter has been set in motion by the operator moving some other part of the machine.

*Mechanism for returning adding mechanism in problems of addition.*—It is important to provide means for returning automatically and simultaneously in problems of addition all of the segments and their corresponding adding keys as soon as the meter has once met the teeth of the segments in its movement around the inner side of the machine and without waiting for the meter to have reached its original or normal position and for this purpose I have provided such means, which I shall only partly explain at the present time, as an explanation of the multiplying mechanism is essential to a clear understanding of the same, which explanation I shall give in the latter part of this specification. For this purpose I provide a lever 66 rigidly mounted on the shaft 55 and extending downward therefrom, carrying at its lower portion a stud pin 67 movable in the slot 69 in the free end of the arm 68, which arm is connected at its other end to a shorter arm 70 mounted on the shaft 71, (see Fig. 3). The shaft 71 extends from the side plate 72 toward the right being mounted at its other end in the bracket 88, (see Figs. 1, 3 and 14 to 17), and the same is operated automatically as later explained.

A spiral spring 73 attached at one end to a stud extending from the side plate 72 and at its other end to the lever 66 serves to keep the lever in its proper position against the stud pin 62, except when it is being operated, and may serve also for the purpose of keeping the lever 56 in its proper position. A stud pin 91, extending outward from the side plate 72 a sufficient distance, limits the backward movement of the lever 66.

*The meter.*—The indicating-meter, which for convenience will be designated in the specification and claims as the "meter", is independent of the adding keys and is used for showing the figures as they are added, indicating the final sum in addition, indicating the product in multiplication, indicating in subtraction, first, the minuend and, second, the difference after deducting the subtrahend, and in division showing, first, the dividend and, second, after dividing the divisor, shows the balance left over, which is smaller than the divisor.

A carriage hub or cylinder 74 is carried by the driving-shaft 28 being keyed thereto as at 75 and is horizontally slidable thereon and carries the two upward-projecting arms 76 and 77, in which arms is journaled the shaft 78 of the numeral wheels 79 of the meter, which shaft for convenience will be hereinafter called the "meter-shaft." The arm 77, which is at the extreme left of the meter, is provided near its upper forward end with a finger 80 projecting towards the right, and which finger is used to turn the indicator-wheels of the indicator as the meter is revolved. The meter in this invention is not revolved away from the operator, as in my other patents, but is revolved towards the operator or front of the machine as soon as it is set in motion, so that the finger 80 operates a wheel of the indicator before any of the numeral wheels 79 of the meter are operated. Upon the upper end of the arm 77 and extending towards the right and arranged to come in contact with another tooth of the indicator to stop the movement of the indicator-wheel of the indicator, moved by the first finger 80, and thus prevent over-rotation, is a second finger 81. The operation of the indicator by these fingers will be later fully explained.

The numeral wheels 79 of the meter are loosely mounted on the meter-shaft 78 and their hubs 82 project a considerable distance on each side, (see Fig. 12) beyond the line of the rims of the wheels, and are separated by the meter supports or arms 93. The meter supports 92, 93 and 94 are carried by the cylinder 74 being keyed thereto as at 75'. The wheels at each extreme end are also separated from the arms 76 and 77 by sleeves, spacers or other means. These numeral wheels 79 each carry upon their periphery a series of teeth 84, preferably ten in number, and between these teeth are spaces 85, on which the mathematical symbols "0," "1," "2," "3," "4," "5," "6," "7," "8," "9," are affixed in any desirable manner, and when the meter is immovable and the numeral wheels 79 are in their normal positions the naughts would show, in a reading line, just above the hood 86, when looking from the line of vision through the sight-orifice 33 of the hood 32. These numeral wheels 79 turn from left to right (which is the reverse of the movement shown in my former patents) when engaged by the teeth 50 of the segments 42, and the next number that would show would be the numeral "1" and the next "2" and so on, and if the wheels had been turned by nine teeth they would be in the position shown in Fig. 12.

The teeth 84 of each numeral wheel 79 extend beyond the rim on each side, projecting in such a way on the left of each wheel that an over-rotation check-pawl 128 will come in contact with two of its teeth (see Fig. 10) to instantly check it in its movement from left to right as soon as its teeth 84 have finished meshing with the teeth 50 of the segments 42, and the teeth also projecting on the right of each wheel in such a way that a carry-up finger 102 (see Figs. 11, 11ª) will strike against one of the projecting teeth, turning the wheel one-tenth of its circumferential distance for transferring the movement of the lower numeral wheel to the next succeeding higher numeral wheel, as from a units to a tens numeral wheel, or from a tens to a hundreds numeral wheel, and so on. A full explanation of the over-rotation check-pawl 128, the carry-up finger 102, and their contiguous parts will be hereinafter given.

Between the arm 76 and the first numeral wheel 79 of the meter and carried by the cylinder 74 being keyed thereto as at 75' is an upward extending arm 92 and similar arms 93 are placed between each of the numeral wheels 79; each of the arms 92 and 93 being provided with the slot 95 for the purpose hereinafter stated.

An arm 94 similar to the arms 93 but without the slot 95 is also placed on the left of the last numeral wheel, between the wheel and the striker-arm 77. Between the arm 76 and the arm 94 and carried by the arms 92 and 93 is a U-shaped hood or guard 86 covering, when the meter is in its normal position, the forward portions of the arms and a large part of the mechanism carried by the arms, also covering the lower half of the numeral wheels 79 so that in looking from the line of vision through the sight-orifice 33 at the meter the desired number to be shown upon each numeral wheel will be seen just above the upper line of the guard 86.

The arms 92, 93 and 94 are separated by the spacers 289 on the cylinder 74 and are held in their proper positions by three tie-rods 96, 97 and 98, which are about equal distance apart, and the tie-rod 97 is situated just within the V-point of the guard. The tie-rod 96 which is placed near the lower edge of the guard is also used to support one end of the flat springs 150, the other end of the springs pressing against the numeral wheels and preventing back movement of the same.

Just below the tie-rod 96 and between this tie-rod and the driving-shaft 28 and extending through the arms 92, 93, 94 and the striker-arm 77 is journaled a rock-shaft 99 provided with a key 100; this rock-shaft 99 being about midway between the driving-shaft 28 and the tie-rod 97. Mounted upon the rock-shaft 99 are the carry-up arms 101 (one for each numeral wheel 79) situated between the arm 92 and the first numeral wheel and between each of the arms 93 and the adjacent numeral wheels on their left, as shown in Fig. 1. These carry-up arms 101 can be clearly understood by examining Figs. 8 to 13, 19 and 20. Each of the arms 101 have keyways 103 through which the key 100 extends, and are also provided with a spiral spring 104 attached to the stud 105 extending outward from the arm towards the left just above the keyway 103 and the other end of the spring being attached to the tie-rod 97, so that the carry-up arms 101 have a forward motion when not held by other means, as hereinafter fully explained.

Each of the carry-up arms 101 is provided about midway with the upward-extending curved parallel fingers 106 and 107, made integral with it and forming a runway 108 through which the guide-pin 109 protrudes; this guide-pin extending outward towards the left from the arm 92 and the arm 93 and causing the carry-up arm 101 when drawn forward by the contraction of the spring 104 to run true.

Immediately in the rear of the run-way and extending outward towards the left from the carry-up arms 101 is a stud 110 upon which is pivoted a carry-up finger 102, the forward or upper push portion of which is normally held against the pin 111 by a spiral spring 112 attached at one end to the lower end of the finger 102, as at 114, and the opposite end attached to a stud 113 extending from the arm 101 just below the stud 105.

The carry-up finger 102 is adapted to strike against the right side of a projecting tooth 84 of the numeral wheel 79 upon its left, turning the numeral wheel one-tenth of its circumferential distance upon each full forward movement of the carry-up arms 101 thus transferring the movement of the lower numeral wheel upon its right to the next succeeding higher numeral wheel upon its left. As there is no higher numeral wheel upon the left of the arm 94 this arm is not provided with the carry-up arm 101 or its carry-up finger 102.

Each carry-up arm 101 is bow-shaped near its upper portion ending in a finger projection 115 which is adapted to run upon the segmental run-away 90, as shown in Figs. 10 and 10$^a$, whenever the carry-up arm 101 has been released and drawn forward by the spring 104, while the meter is passing the teeth 50 on the segments 42 and thus preventing the carry-up arm 101 from going its full forward distance and the carry-up finger 102 from coming in contact with its corresponding numeral wheel 79, as it is not desirable to carry-up from one numeral wheel to the next succeeding higher numeral wheel while the numeral wheels are passing through the segments, but the runway 90 only extends a short distance below the segments, as shown in Fig. 3 so that the carrying process is completed immediately after the numeral wheels of the meter have passed the segments 42 as shown in Figs. 11, 11$^a$.

As the meter is revolving around the inner side of the machine the finger 115 of the carry-up arm 101 meets the recocking fingers 187 upon the left sides of the plates 72, 51 and 295, as shown in Figs. 1 and 3, by which each of the arms in its turn, commencing with the arm on the right, is recocked. The arms 101 may also be recocked by the turning from left to right of the rock-shaft 99 by the backward movement of the plate 152 see Fig. 4 as hereinafter explained.

In order to have a recocking finger for each of the arms 101 I have provided the necessary additional plates 295 in the rear of the machine, as shown in Fig. 1, to support the additional recocking fingers.

Recocking could be done simultaneously but it would throw a heavy load on meter shaft during that short space of its revolution. This would tend to disturb an even speed of the meter which is desirable. By making it successively, as shown, this load is distributed over a much larger space of the revolution of the meter.

There is only one recocking finger for each of the arms 101. The recocking finger to the extreme right is attached to plate 72 and one recocking finger to each of the plates 51, but as there is only one plate 51 to the left of the extreme left bank of segments it is necessary to provide the additional short plates 295 for each of the arms 101 on the left portion of the meter so that there is a recocking finger for each of the arms 101 when the meter is in its normal position; this is necessary when addition is being carried on in larger sums of long columns and there is a considerable amount of carrying up on the wheels of the meter to the left that are not touched by the teeth of the segments as the meter is revolved. Also when these wheels to the left are operated in multiplication by carry-ups. Of course these left recocking fingers are not always used but there are cases when it is necessary to have them.

Extending from the left side of the carry-up arm 101 about midway between the pin 111 and the end of the finger 115 is a stud 116 (see Fig. 11) carrying a pawl 117 having a projection or hook 118 extending towards the right (see Fig. 12) and adapted to be seated within the slot 95 and extending through to be met by the tooth 119 of the cam 120, which cam is carried on the hub 121 of the numeral wheel 79, each of the hubs 121 being on the meter-shaft 78 and each numeral wheel turns its respective cam 120. A similar cam 120 is also provided upon the hub 122 situated between the arms 76 and 92. The pawl 117 is also provided with a short arm carrying a spring 123 which spring presses against a stud 124 so that the long arm of the pawl 117 and its hook 118 will be held downward except when pushed upward by the tooth 119 of the cam 120 and held in this position, as shown in Fig. 10, by the upper curved portion of the arm 93. The arm 101 is also provided with a stud 297 against which the short arm of the pawl 117 is pressed by the force of its spring 123, as shown in Fig. 8, but when the tooth 119 of the cam 120 rides the pawl upward so that the hook 118 is on the curved portion of the arm 93, the short arm of the pawl 117 is away from the stud 297 (see Fig. 10) but when the finger 115 has run off the runway 90, the spring 123 working against the stud 124 keeps the short arm of the pawl 117 against the stud 297, which stud 297 prevents it from dropping too far down; see Fig. 11. A curved tooth 125 also extends outward from the left of the carry-up arm 101 just above the pin 111 and this tooth is adapted to come in contact with another projecting tooth 84 of the numeral wheel when the carry-up finger 102 is thrown forward from the position shown in Fig. 10 to the position shown in Fig. 11. The carry-up fingers 102 and the teeth 125 come in contact only with the portion of the teeth 84 that project beyond the rim on the right side of the numeral wheels 79 and never come in contact with the portions of the teeth 84 that project beyond the rim on the left side of the wheels.

The arm 94 is not provided with a carry-up arm 101 or any of the parts carried by it for the obvious reason that there is no need of these parts beyond the highest numeral wheel, but the parts of the mechanism which I shall now describe as being carried by the arms 93 are also carried by the arm 94 but not by the arm 92.

Projecting from the right side of each of the arms 93 and 94 is a stud 126 upon which is pivoted an over-rotation check-pawl 128 which is provided with a tongue 129 adapted to be thrown between two teeth 84 of a numeral wheel 79 by the pressing back of the opposite arm 127, by the pin 131 upon the end of this arm, coming in contact with a forward projecting lip 132 of the side plate 51, so that as the numeral wheels leave the segments 42, as shown in Fig. 10, the pawls are thrown in contact with that portion of the teeth 84 that projects beyond the rims of the numeral wheels 79 on their left sides in such a manner as shown in the drawings that will instantly stop the forward movement of the numeral wheels and prevent over-rotation. The pawl 128 is however normally held out of contact with the teeth 84 by a spiral spring 130 one end of which is attached to a stud carried by it to draw it downward and backward against a pin 149; the opposite end of the spring being attached to a stud 133 on the further rear end of the arm 93 or the arm 94, as the case may be.

Each of the numeral wheels 79 consists of a web 135 on the hubs 121 carrying a rim 134 provided with the teeth 84 between which are the spaces 85 carrying the mathematical symbols. Beneath the rim 134 on the right side of each wheel and extending outward from the web 135 is a spring-pressed pawl 136, which extends through a slot in the hub 121 and against the shaft 78 of the meter and is held in place by its spring 137 pressing against the inner side of the rim 134.

As the shaft 78 is turned the pawls 136 fall into the slots 138 in the shaft 78, so that the numeral wheels may all be simultaneously turned back to their normal positions, and the meter is thus set at naught, that is, so that all of the numeral wheels "0" are in a line on the reading line of the meter. A similar spring-pressed pawl is within each of the indicator-wheels 139 of the indicator, so that the indicator can be set in a similar way back to its original position after each arithmetical problem.

*The indicator.*—In the left forward portion of the machine and seen through the sight-orifice 33 is situated the indicator see Figs. 1 and 4 consisting of the shaft 142 carrying the freely-movable hubs 143 of the indicator wheels 139. Each wheel is adapted to be turned from left to right and is provided with a series of teeth 140, preferably ten in number, and between these teeth are spaces 141 on which the mathematical symbols "0", "1", "2", "3", "4", "5", "6", "7", "8", "9", are marked and when the indicator-wheels 139 are in their normal positions the naughts would show just above the forward edge of the sight-orifice 33 so as to make a good even reading line for the indicator.

The teeth 140 of each wheel project beyond the rim on the left side of each wheel to be met by the finger 80 projecting towards the right on the upper forward end of the arm 77 so that one of the wheels 139 of the indicator is moved one-tenth of its circumferential distance each time as the meter is revolved by its driving-shaft. Each wheel is prevented from over-rotation by the finger 81, upon the arm 77 in the rear of and somewhat above the finger 80, coming in contact with the projecting part of another one of the teeth 140 on the indicator-wheel immediately after the revolving of this same indicator-wheel by the pressure of the finger 80 so as to instantly check the movement of this wheel.

The indicator is supplied with spring-pressed pawls 144 similar to those of the numeral-wheels 79 of the meter, which pawls extend through slots in the hubs 143 and into a slot in the indicator-shaft 142 so that the shaft can be turned and the indicator-wheels simultaneously turned forward to initial position.

The indicator does not shift from right to left similar to the meter but remains in a stationary position so that when the meter is revolved in its first position, the first or left hand wheel of the indicator would be operated; when the meter has been shifted one position the second wheel (that is the second wheel from the left end of the machine) would be operated, and so on.

Loosely mounted upon the shaft 142 is a gear 145 carrying a ratchet 147 adapted to be met by a spring-pressed pawl 148 on the wheel 146 rigidly attached to the shaft 142 so that when the gear 145 is turned a sufficient distance from left to right by the teeth 291 of the sector 160, or by any other means, the indicator-wheels 139 will be turned around by the shaft 142 as previously explained. Upon the backward movement of the sector, see Fig. 4, the pawl 148 passes over the teeth of the ratchet 147, and the shaft 142 and the indicator wheels 139 are not moved.

*Resetting means.*—The teeth 291 of the sector 160 are held in alinement with the teeth of the gear 145 by the guide-pin 162 in its curved slot 161, as clearly shown in Fig. 4. This sector is provided with the arm 163 to which is fastened one end of a spring 293, for returning the sector, and having its other end fastened as at 294 to the inner side of the left end wall 22.

Secured in any suitable manner upon the sleeve or cylinder 74 is a disk revolving with it and a lever 168 encircles this disk and turns upon it; the lever also carries an upward extending lip 171 provided with a pin 177 extending through the inclined slot 174 of the curved rack 173, provided with the teeth 292 to mesh with the teeth of the gear 164 on the shaft 78. This gear carries a ratchet 165 whose teeth are met by a spring-pressed pawl 167 on the disk 166 secured on the shaft 78, so that as the rack 173 moves the gear from left to right, the disk and the shaft 78 are also turned from left to right to move the numeral wheels of the meter as hereinbefore explained.

When the rack is returned to initial position, the gear and ratchet are revolved from right to left but without turning the disk or shaft, as is clearly understood. The rack 173 is also provided with the slot 176, similar to the slot 174, and through which the pin 179 extends from the lever 168. A bar 172, movable upon the pin 170 of the lip 169 of the lever 168, is provided at its lower end with a pin 178 extending through the slot 175 of the rack 173 and which pin presses against the side of the slot when the upper handle portion 182 of the bar 172 is pressed against the upper handle portion of the lever 168, so that the rack is pressed upward to have its teeth in meshing contact with the teeth of the gear 164 when the handle portion 182, without the case is drawn forward through a forward extending portion of the slot 186. The slot 186 also extends lengthwise of the machine for a distance equal to the lengthwise movement of the meter. A spring 181 returns the rack 173 and bar 172 to initial positions as soon as pressure is withdrawn from the handle 182.

Upon the rock-shaft 99 on the left side of the arm 77 is firmly secured a plate 152 having its lower end secured by a spring 153 to a lip 154 of the arm 77 but the lower end is limited in its downward movement by the pin 155 on the arm. This plate carries a stud 156 upon which is freely movable a spring pawl 157 having its spring 158 pressing against a pin on the plate and its tail end pressing against another pin 159 also on the plate.

As the lever 168 is moved forward its pin 183 carries forward the sector 160, and the pin 180 on the rack 173 presses against the pawl 157, slightly raising it and pressing its spring 158 against the pin, but passes beyond the pawl which is returned to initial position with its tail against the pin 159, by the force of its spring 158. When the rack is returned the pin 180 forces the pawl and its plate 152 backward thus rocking the shaft 99 and re-cocking the carry-up arms 101.

From the rear lower portion of the arm 77 extends a finger 185 to which is attached one end of the spiral spring 184 attached at its other end to the governor wheel 208 to draw the meter and its carriage towards the right of the machine upon each downward motion of the latch or detent 263.

*Meter shifting mechanism.*—The governor wheel 208 supports below the shaft 28 a latch-casing 260 whose other end extends through, and is supported by the arm 76. Immediately in the rear of the latch-casing, parallel with it, and supported at its right end by the governor wheel is a rock-shaft 246 also supported by and extending through the arm.

Upon the rock-shaft is adapted to slide a trip-pawl 259, keyed to the shaft by the key 248, and supported by the bracket 258 attached by screws or other means to the right side of the arm. The meter is controlled in its movement from left to right by the latches 263 supported within the latch-casing in its recessed plate 296; each latch being held in an upward position by a spring 265 (as clearly shown in Fig. 5) so that its latch face 264 is held against the right side of the arm 76 (when the arm has moved to that respective latch) until it is drawn down and is out of contact with the arm, by its pin 261, extending through the slot 262 of the latch-casing, being drawn down by the trip-pawl turned by its rock-shaft when the rock-shaft is rocked by the movement of the lever 244, as later explained.

*Multiplying mechanism.*—On the right of the machine are the secondary finger or multiplying-keys 213, hereinafter called the multiplying-keys, attached to the shanks 214 having lips 220 at their lower ends to which are fastened the lower ends of the springs 219, the upper ends of the springs being attached to the framework, so that the multiplying-keys are normally held in their upper positions except when they are operated by downward pressure.

Each shank is provided with the guide-pin 218 extending through a slot 217 in the framework, and with a guide-slot 215 through which extends from the side of the casing a guide-pin 216. These multiplying-keys are adapted to impart different degrees of rotative movement to the driving-shaft, according to the designating-numerals from "1" to "9" upon the several keys, ranging from the second key at the bottom to the tenth or top key.

The bottom or lower key shown in Fig. 2 and numbered 230 is the zero key, bearing upon its face the numeral "0". This key does not revolve the driving-shaft but, when pressed down, it operates the lever 244 turning the rock-shaft 246 pressing down the trip-pawl 259 and the pin 261 upon which it is resting so that the face 264 of the latch 263 is drawn down allowing the arm 76 to pass over it and strike against the face of the next latch to the right. The arm is carried to the right by force of the spring 184, and is stopped by the next latch in a position so that the trip-pawl rests upon the pin of the next latch. It will be thus seen that with this arrangement the arm can only move the distance between two latches with each downward movement of the trip-pawl, this distance being equal to the distance from the center of a numeral wheel of the meter to the center of the next numeral wheel, so that upon each movement of the arm to the right the numeral wheels are moved one position to the right, so that the displaced segments would then operate, if the driving-shaft was revolved, the numeral wheels next in order to the left. This key 230 is used when one or more naughts appear in the multiplier, so that the meter may be shifted to the right without revolving the driving-shaft. The key 230 which carries the shank 235 is provided near its upper end with a slot 231 through which a pin 232 extends from one of the two side-walls which inclose the greater part of the multiplying mechanism.

A pin 234 carried by the lower end of the shank and guided in the slot 233 of the side-wall, is adapted to push down the lever 236 turning its shaft 238 and moving up the free end of the lever 237 rigidly attached to the shaft 238. See Figs. 2 and 18. The lever 237 comes in contact with a pin 240 of the lever 239 attached upon the shaft 241 forcing it upward, and this lever has an upward extending arm 242 adapted to be pressed down against the pin 245 of the lever 244, as the lever 239 is forced upward, moving the lever 244 slightly downward, enough to rock the rock-shaft 246, for the purpose hereinbefore explained. The lever 244 is held in its normal position against the pin 282, extending outward from the governor wheel 208, by its spring 281; this spring having its other end fastened to the governor wheel. See Fig. 7.

A spring 243 attached at one end to one of the side-walls and at its other end to the arm 242, returns the levers, 239, 237 and 236, and the shank 235 to their initial positions, as shown, as the pressure is withdrawn from the finger key 230. The shank 235 may also be provided with a lip 220 and a spring 219 similar to the ones used on the shanks of the multiplying-keys in order to return the finger key 230 instantly to initial position as soon as the operator removes his finger from this key.

Extending on an incline, parallel to the top of the multiplying-keys, and just above the series of guide-pins 216 is a cover or frame 35 for covering the front portion of the multiplying mechanism situated between the two side-walls.

All of the multiplying keys move downward the same distance and in the same direction, and as one is pressed down the pin 218 on the lowest portion of its shank strikes against the upper face of an inwardly-swinging segment 224 pivoted at the top on the shaft 222 and having a series of ten teeth 226 at its lower backward portion which are in mesh with the pinion 268 on the shaft 267 which has also ten teeth and which is adapted to be moved one-tenth of its distance, to revolve the driving-shaft once around, when the multiplying-key bearing the numeral "1" is pressed downward, and so on, so that when the multiplying-key bearing the numeral "9" is operated the swinging segment is swung its full distance inward operating the pinion so that the driving-shaft is revolved around nine times, carrying the numeral wheels of the meter against the displaced segments nine times to multiply the amount represented by the depressed adding keys by nine.

A spring 225 fastened to one of the side-walls is attached to the lower portion of the swinging segment to assist in returning the segment to its normal position. The upper forward portion of the swinging segment is shaped as shown in Fig. 2 so that all of the multiplying-keys will have the same amount of downward movement.

As the shaft 267 is turned by the pinion 268 it turns the gear 269 which turns the pinion 272 on the shaft 271 which shaft carries a gear 273 meshing with a pinion 274 loosely mounted on the driving-shaft 28 but carrying a ratchet 275.

Upon the right side wall of the multiplying mechanism is a plate or bar 228 provided with two parallel fingers 249 and 249' which extend through the right side-wall, in the rear of the swinging lever 221 and through an opening 227 in the swinging segment 224. The forward finger 249' extending through the left side-wall as at 250 and normally having a detent 251 of the arm 229 resting upon it, so that this arm which is firmly secured to the driving-shaft 28 is prevented from moving until the plate 228 has been moved rearward; it is thus seen that while the detent 251 rests upon the portion 250, the driving-shaft and its meter are secured from revolving.

The swinging lever 221 pivoted on the shaft 222 is also adapted to be swung inward by the depressed multiplying-key, upon the last portion of its movement and to move backward the portion 250 freeing the detent 251. As soon as pressure is removed from the multiplying-key, the spring 223, attached to the lower portion of the swinging lever, returns it to its original position.

When the detent is freed the arm 229 drops downward to a distance allowed by the spring 280 on the bar 279, the driving-shaft commences instantly to revolve from right to left carrying around the meter so that the teeth of its numeral wheels will be met by the teeth of the depressed segments 42. As soon as the arm 229 drops downward it frees a pawl 276 on the stud 277 of the governor wheel, which pawl is thrown by its spring 278 into mesh with a tooth of the ratchet 275 and the gears and pinions 274, 273, 272, 269 and 268 are revolved backward; the pinion 268 sending forward the swinging segment 224 until it has been returned to its initial position, ready for the next operation. As the swinging segment nears the last portion of its movement it strikes against the rear edge of the finger 249 and moves the bar 228 forward so that the portion 250 of the finger 249' will be in position to receive the detent as the arm swings around on its last revolution. See Figs. 2 and 18. As the arm 229 is brought to a stop it forces upward the pawl 276 disengaging it from the ratchet 275.

On a stud 252 extending from the rear of the arm 229 is a pawl 253 having a pin 255 extending into a clearance slot 254; the pin being held against the lower side of the slot and the pawl in a downward position by its spring 256 pressing against a pin 257.

As the arm 229 is freed and drops downward the pawl 253 moves over the top of the nose 247 until its lower end is in the rear of the upper portion of the nose but as the arm 229 comes to a sudden stop by its detent 251 striking upon the portion 250 the pawl 253 forces the nose forward and downward, forcing the arm 244 downward rocking the shaft 246, pressing down the trip-pawl 259 and freeing the latch 263 from the arm 76 allowing a sidewise movement of the meter, it is thus seen, that there is an automatic longitudinal movement of the meter as the meter reaches its uppermost position as the driving-shaft completes its last revolution.

I will now explain the means used for revolving the meter independently of the multiplying keys, for use in problems of addition and subtraction. For this purpose, I use a finger bar 188 having its shank 189 supported against the side plate 72 by the guide-pins 192 and 193 passing through its elongated slots 190 and 191. This bar is slightly higher than the finger keys 38, and being adjacent to the right row of finger keys, is quickly operated. As it is forced downward, the lower end of its shank presses downward the free end of a lever 194 on the shaft 195 which turns and forces backward the free end of the lever 196 carried by it. This lever 196 forces backward the portion 250 freeing the detent 251 and allowing one revolution of the driving-shaft 28. (See Figs. 1, 2, 3, and 18.)

To the left of the governor wheel and attached to the base frame of the machine is a bracket 88 having its front face in the form of a segment and carrying a rim 204 provided with the lower slot 201 and the upper slot 202 adapted to receive the handle 203 of a setting-lever 198 loosely mounted on the shaft 71; this lever having a finger 200 provided with an enlarged keyway 199, so that the lever may be moved from the upper to the lower slot, and vice versa, without turning the shaft 71. This lever 198 carries a pin 207 which presses against the front side of a lever 205 also upon the shaft 71 and having the key 197 extending through its enlarged keyway 199 so that the lever is forced backward when the handle 203 is moved from the lower slot 201 to the upper slot 202. When the handle is moved downward to the lower slot a spring 206 returns the lever 205 to its normal position.
Upon the governor wheel 208 is a pin 209 just forward of the meter and this pin is adapted, immediately after the numeral wheels have passed the teeth of the segments, when the handle 198 is within the upper slot 202, to strike against the front side of this lever 205 pressing it slightly backward turning the shaft 71 and operating the lever 66 and pawls 59 releasing the displaced segments 42 allowing them to return to their original positions, as hereinbefore explained, so that the segments may be automatically released in problems of addition immediately after the meter has passed the segments. Upon the governor wheel is also secured by the pins 212, carried by the wheel, passing through its slots 211, a lever 210 held in a rear downward position by its spring 270, which spring has its other end attached to the governor wheel. The lever is also provided near its upper end with a clearance slot, through the upper portion of which slot the rockshaft 246 extends. This lever has a curved upper face adapted to come in contact with the pin 255 just before the detent 251 strikes upon the portion 250 of the finger 249', to hold the pawl 253 upward so that as the governor wheel completes its movement, the arm being held by its detent, that the pawl 253 will not strike the nose 247 and operate the shifting mechanism. (See Figs. 5 and 6.) This lever 210 is of use when additions are being made and to automatically force it upward on each revolution of the governor wheel I have adapted its lower face to be met by the curved upper end of the finger 200 which finger forces it upward and holds it there a sufficient time to allow the pawl to clear the nose. It is of course understood, that in problems of multiplication and division the handle 203 would be lowered to the lower slot 201 so that the finger 200 would not be met by the lever 210 when the meter is revolved.
To regulate the movement of the driving-shaft 28 and cause uniform revolutions, I provide a fan governor 283 whose shaft carries a gear 284 having its teeth in mesh with the teeth of the governor wheel. A ratchet 285 also carried by the same shaft and held from backward movement by a spring pawl 286 prevents the backward movement of the governor wheel. The pawl 286 has its spring 287 pressing against the pin 288.
To operate the machine for addition, the following example is stated: Add "5002", "365", and "4902". First, raise the handle 203 of the lever 198, which is without the framework, so that the handle rests within the slot 202. Press down the adding key 38 of the fourth row, which is marked with the numeral "5". Also before, afterwards or simultaneously press down the adding key 38 of the first row, which bears the numeral "2". As they are pressed down they become locked by the pawls 59 so that their teeth will be met respectively by the fourth and first numeral wheels 79 of the meter when it is revolved. To revolve the meter, press down on the finger bar 188, and the driving-shaft instantly revolves once around, so that upon the meter could be read, through the sight-orifice, the figures "5002". The adding-keys and their segments having been automatically released, press down the adding-key of the third row, which is marked with the numeral "3", then the one marked "6" on the second row, and the one marked "5" in the first or right hand row. Again press down the bar 188 and the meter being revolved, will read "5367". Then press down the adding-key 38 of the fourth row bearing the numeral "4", and the key of the third row bearing the numeral "9", and the key of the first row bearing the numeral "2". Again press the bar 188 and the meter will be revolved and will show the total "10269" upon the first five numeral wheels of the meter, while the left hand wheel 139 of the indicator will have the numeral "3" upon its reading line showing that the meter had been revolved three times, i. e., that there were three lines of figures added.
To reset the machine press together the handle 182 and swing it forward and then backward, and the machine is ready for the next problem.
When it is desired to employ the machine for multiplication, set the handle 203 in the slot 201. The adding-keys must first be pressed down for the multiplicand, which for example we will say is 5975, then the multiplicand multiplied by the unit figure by pressing down the proper multiplying key, which we will say in this problem is "6"; then the multiplicand multiplied by the tens figure of the multiplier, which we will call "4"; the next figure of the multiplier being the figure "0" we press down the finger key 230; the multiplicand is then multiplied by the thousands figure by pressing down the proper multiplying key, which for example is the figure "7". The meter will then read through the sight-orifice with the figures "38,281,825" upon the reading line of the meter, showing upon the eight wheels of the meter. The indicator will read commencing with the right hand wheel "6407" showing that this figure was the amount of the multiplier.

To reset the machine press down the lever 56 to free the segments and their adding keys; also move the handle 182 to the left, press the parts of the handle together then swing it forward and backward and all parts of the machine are in their normal positions.

It is to be understood that my invention is not limited to the specific details of construction shown in the accompanying drawings, but that said details may be varied in the practical carrying out of my invention. It is also to be understood that the conditions specifically set forth in the several claims are intended to be separately claimed without limitation to the use in connection therewith of other features and details of construction illustrated.

Having thus described my invention, what I claim as new is:

1. In a calculating-machine, a meter, a driving shaft and several parallel series of toothed segments arranged so that corresponding teeth of all of the segments are in alinement and adapted when displaced out of normal position to be met by the meter when it is revolved by its driving shaft.

2. In a calculating-machine, a series of toothed segments, an indicator, and an epicycle cylindrical meter adapted to be operated by the toothed segments but operating a wheel of the indicator on each revolution before its wheels are operated.

3. In a calculating-machine, an epicycle cylindrical meter, means for operating the wheels of the meter as it is revolved, multiplying-mechanism for revolving the meter as many times as desired, keys of different denominational values for operating the multiplying-mechanism, and an adding-key independent of the keys for revolving the meter once in problems of addition.

4. In a calculating machine, an epicycle cylindrical meter, a motor spring for revolving the meter; multiplying keys for regulating the revolving of the meter; a spring for moving the meter longitudinally, and means automatically operated for allowing of the moving of the meter by the spring one position towards the right after each operation of a multiplying key.

5. In a calculating-machine, an epicycle cylindrical meter, multiplying-keys for revolving the meter as desired, means for automatically moving the meter one position sidewise after each series of revolutions by the operation of a multiplying-key and a key for moving the meter one position sidewise without revolving the meter.

6. In a calculating machine having an epicycle meter, a series of toothed segments forward of the meter and adapted to be projected inward and downward for simultaneously rotating parts of the meter as it is revolved in a circle.

7. A revolving meter having a series of independently-revoluble indicator-wheels in combination with a series of sectors for separately and simultaneously turning the indicator-wheels as the meter is revolved.

8. A calculating-machine having an epicycle meter, means for moving the meter longitudinally, latches for limiting the longitudinal movement and a trip-pawl for operating the latches.

9. A calculating-machine having an epicycle meter, means for automatically moving the meter longitudinally, latches for limiting the longitudinal movement and an automatically operated trip-pawl for operating the latches.

10. A calculating-machine having an epicycle meter, means for moving the meter longitudinally, latches for limiting the longitudinal movement, an automatically operated trip-pawl for operating the latches and means for disconnecting the trip-pawl so that the latches will not be operated when the meter is operated.

11. In a calculating-machine, a series of curved toothed racks, means for throwing the toothed racks into parallel positions said racks being arranged so that corresponding teeth of all of the racks thrown out are in alinement, and a meter having a series of toothed wheels adapted to have the teeth of its wheels mesh with the racks as it is revolved.

12. In a calculating-machine, an epicycle meter, a series of numeral wheels upon the meter a series of sectors for operating wheels of the meter as the meter revolves past the sectors and carry-up mechanism operable immediately after the meter has passed the series of sectors.

13. In a calculating-machine, an epicycle cylindrical meter, a series of parallel curved racks for simultaneously operating wheels of the meter, and carry-up mechanisms simultaneously operable after the wheels have been operated by the racks.

14. In a calculating-machine, an epicycle cylindrical meter, a series of curved racks for operating wheels of the meter, carry-up mechanism operable after the meter has passed the racks and means for resetting the operated carry-up mechanism on each revolution before the meter has completed the revolution.

15. In a calculating-machine, a revolving meter, means for revolving the meter, and a swinging segment for limiting the revolutions of the meter.

16. In a calculating-machine, a revolving meter, means for revolving the meter, a swinging segment for limiting the revolutions of the meter and means for returning the segment to its original position.

17. In a calculating-machine, a revolving meter, means for revolving the meter, a swinging segment for limiting the revolutions of the meter and a series of keys for controlling the inward swing of the segment.

18. A calculating-machine having a meter, a shaft outside of the meter means for revolving the meter around the shaft, means for rotating the separate wheels of the meter, a swinging segment for limiting the revolutions of the meter, finger-keys for controlling the movements of the segment and means for returning the segment to initial position as the meter is revolved.

19. A calculating-machine having a rotatable shaft, a cylinder slidable upon and turning with the shaft, a meter carried by and without the cylinder, means for simultaneously revolving the wheels of the meter, a spring for sliding the cylinder upon the shaft, latches for limiting the sliding movement of the cylinder, pins protruding from the latches and a lever for pressing down the pins and unlocking the latches.

20. In a calculating-machine having a shaft, means for driving the shaft, a carriage slidably keyed upon the shaft, a number of series of toothed racks, a meter carried by the carriage having indicator-wheels operable by the racks, latches for limiting the longitudinal movement of the carriage, a trip-pawl for unlocking the latches whereby the indicator-wheels of the meter may be brought in contact with racks of a lower denominational value to obtain results in multiplication, and means for automatically operating the trip-pawl, substantially as shown.

21. In a calculating-machine a recording-meter, racks, means for swinging the meter in contact with a portion of the racks, a swinging segment for controlling the movements of the meter, keys of different denominational value for limiting the movements of the segment, and an indicator for indicating the keys operated.

22. A calculating-machine having curved toothed racks, each set comprising nine racks having finger-keys of different values, a meter having indicating-wheels swung upon a revoluble shaft, a spring for moving the meter longitudinally, and means automatically operated for allowing the spring to move the meter longitudinally and bring the wheels that are normally out of contact with the racks in contact with the racks, substantially as shown and described.

23. A calculating-machine provided with an epicycle cylindrical meter, several series of parallel toothed segments, and means for throwing the segments inwardly and downwardly a uniform distance to be met simultaneously by the meter when revolved.

24. A calculating-machine provided with an epicycle cylindrical meter, several series of parallel toothed segments forward of the meter adapted to be thrown inwardly and downwardly a uniform distance to be met simultaneously by the revolving meter and several series of adding-keys having uniform downwardly inclined movement to operate the segments.

25. In a calculating-machine provided with an epicycle cylindrical meter of several series of toothed segments, each segment being provided with an opening extending therethrough, a spring-pressed pawl within each opening resting against a portion of each segment of its series adapted when the segments are operated to lock them in their displaced positions so that they will be met by the meter when it is revolved, and a lever for simultaneously disconnecting all of the pawls.

26. In a calculating-machine, a revolving meter, a series of toothed racks for operating the wheels of the meter when it is revolved adding-keys for operating the toothed racks and means automatically operated for returning the adding-keys and their toothed racks to their normal positions in problems of addition as soon as the meter has been operated by the depressed keys.

27. In a calculating-machine, a revolving meter, a series of toothed segments provided with a common opening, a tooth upon each segment extending into the opening and forming a lower and an upper notch, a spring-pressed pawl within the opening normally resting within the lower notch against the face of the tooth and adapted to rest within the upper notch, against the upper face of the tooth, of the displaced segment locking it in this position to be met by the revolving meter.

28. In a calculating-machine, an epicycle cylindrical meter, toothed segments adapted to be thrown in the path of the meter, and means for automatically and simultaneously returning the displaced segments as soon as the meter has once met the teeth of the segments in its movement around the inner side of the machine and before the meter reaches its original position.

29. In a calculating-machine, a revolving meter, several series of adding keys, toothed segments arranged to be thrown out of their normal positions by the keys, and automatic means for returning simultaneously all of the displaced keys and segments after the meter has been put in operation and before it completes its movement.

30. In a calculating-machine, an epicycle cylindrical meter, toothed segments for operating the meter and an over-rotation check-pawl adapted to swing upon the meter as it leaves the segments and prevent over-rotation.

31. In a calculating-machine, several series of toothed segments, keys for displacing the segments as desired, a meter provided with several toothed numeral wheels, means for meshing the teeth of the wheels with the teeth of the displaced segments, and an over-rotation check-pawl for each of the wheels adapted to be thrown against two teeth of its wheel as the teeth of the wheel leave the last tooth of the segment.

32. In a calculating-machine, a driving-shaft, a cylinder keyed to the shaft, arms carried by the cylinder, toothed numeral wheels between each pair of arms, toothed segments adapted to be placed in the path of the numeral wheels as the driving-shaft is revolved, a check-pawl carried by one of the arms for each of the numeral wheels and adapted to be swung between two teeth of a numeral wheel as the wheel leaves the segments and prevent over-rotation.

33. In a calculating-machine, a driving-shaft, a meter carriage provided with toothed wheels revolved without and by the shaft, toothed segments for operating the toothed wheels as the shaft is revolved, check-pawls carried by the meter carriage, and rigid means adjacent to the segments for locking the operated wheels and preventing excessive movement as soon as the wheels have been operated by the segments.

34. In a calculating-machine, a driving-shaft, a cylinder keyed to the shaft, arms carried by the cylinder, a meter consisting of several toothed numeral wheels journaled in the arms, several series of toothed segments for operating wheels of the meter as the driving-shaft is revolved, check-pawls pivotally mounted on the arms for each of the wheels and a lip adjacent to each series of segments for swinging the pawl into mesh with teeth of the wheel operated by the segment of that series and prevent further rotation of the wheel.

35. In a calculating-machine, an epicycle cylindrical meter, means for rotating the wheels of the meter as the meter is revolved, pivoted check-pawls carried by the meter, rigid lips for swinging the tongue of a pawl against each of the rotating wheels while the meter is being revolved as soon as the wheels pass the rotating means and springs adapted to withdraw the pawls from the wheels as soon as the pawls pass the rigid lips.

36. In a calculating-machine having an epicycle cylindrical meter provided with wheels, toothed segments for operating the wheels of the meter as it is revolved, and carry-up mechanism operable only after the wheels have passed and been operated by the segments.

37. In a calculating-machine having an epicycle cylindrical meter of carry-up mechanism for the wheels of the meter, segments for operating the wheels and means for preventing the complete movement of the carry-up mechanism until after the wheels have passed the teeth of the segments.

38. In a calculating-machine having an epicycle cylindrical meter of carry-up mechanism, toothed segments, keys for placing the teeth of the segments in the path of the meter to operate it as it is revolved, means for preventing the complete movement of the carry-up mechanism until after the meter has passed the teeth of the segments and means for preventing over-rotation of the meter when it is operated by the carry-up mechanism.

39. In a calculating-machine, a driving-shaft, a meter without and revolved with the shaft, adding-keys carrying toothed segments adapted to be displaced so as to operate the meter as it is revolved, multiplying mechanism adapted to rotate the shaft as many times as desired and shift the meter one position sidewise upon the completion of the rotations, means connected with the adding-keys adapted to be placed in operable contact with the multiplying mechanism to prevent the sidewise movement of the meter when it has completed its rotations, and to be operated by the multiplying mechanism to return the adding-keys and their segments to their initial positions.

40. In a calculating-machine, toothed segments, adding-keys for operating the segments, a cylindrical toothed meter, a driving-shaft without the meter for revolving the meter against the operated segments, the teeth of each wheel of the meter extending beyond the rim of the wheel on both sides, a check-pawl for meshing with the projecting teeth on the right side of the wheel to prevent over-rotation of the wheel as the teeth of the meter leave the teeth of the segments, a carry-up finger for pushing the projection of one of the teeth on the left of the wheel after the check-pawl has been withdrawn from the teeth, turning the wheel one-tenth of its circumferential distance, and a swinging tooth for locking the wheel, immediately after the carry-up finger has operated, by coming in contact with the left projection of one of the teeth of the wheel.

41. In a calculating-machine, a driving-shaft, a hub carried by the shaft, arms carried by the hub, a shaft mounted in the arms, numeral wheels carried by the shaft between the arms provided with teeth projecting beyond both sides of the wheels, toothed segments, means for displacing the segments so that they will rotate the wheels of the meter as it is revolved, a check-pawl for each of the wheels adapted to mesh with the projecting teeth on the left side of the wheel as the teeth of the wheels leave the teeth of the segment to prevent over-rotation, carry-up arms pivoted on the arms of the hub, a pawl on each carry-up arm for locking the carry-up arm normally seated in a slot of one of the arms, a cam for unlocking the pawl and allowing forward movement of the carry-up arm, a segmental run-way for preventing the full forward movement of the carry-up arm until the meter has passed the toothed segments, a carry-up finger pivoted on the carry-up arm for rotating the wheel one-tenth of its circumferential distance by pushing one of the projecting teeth on the right of the wheel as the carry-up arm completes its movement after the check-pawl has been released, a curved tooth on the carry-up arm for preventing over-rotation caused by the carry-up finger, and rigid fingers on the inner rear side of the machine adapted to meet the carry-up arms and recock them while the driving-shaft is being revolved.

42. In a calculating-machine, an epicycle cylindrical meter, a driving-shaft, means for operating the wheels of the meter as it is revolved around the driving-shaft, and a lever adapted when pulled forward to rotate the wheels of the meter to initial position.

43. In a calculating-machine, a shaft, a meter on the shaft, a gear on the shaft, a lever, a toothed rack carried by the lever, a handle pivoted on the lever for raising the rack to be in meshing contact with the gear so that the meter will be reset on forward movement of the handle.

44. In a calculating-machine having an epicycle cylindrical meter and means for operating the meter of carry-up arms, a resetting lever adapted when pulled forward to reset the meter, and means operated by the backward movement of the lever for recocking the carry-up arms after the meter has been reset.

45. In a calculating-machine, an epicycle cylindrical meter, an indicator, a lever, a toothed rack on the lever adapted to carry forward the meter to initial position by the forward movement of the lever and a toothed sector adapted to be met by the lever in its forward movement and carry forward the indicator to initial position.

46. In a calculating-machine, a revolving meter, means for revolving the meter, a series of multiplying keys, and a swinging segment independent of and operated by any one of the keys to govern the revolutions of the meter.

47. In a calculating-machine, an epicycle cylindrical meter, means for revolving the meter, a swinging segment for governing the revolutions of the meter, means for returning the segment as the meter is revolved, and multiplying keys of different denominational value independent of but adapted to operate the segment.

48. In a calculating-machine, an epicycle cylindrical meter, means for revolving the meter, a swinging segment for governing the revolutions of the meter, a series of multiplying keys independent of and adapted to operate the segment, a swinging lever operated by the keys to place in operation the means for revolving the meter when the segment has reached nearly its full movement allowed by the depressed key, a spring for returning the swinging lever as soon as pressure is removed from the key, and means for returning the segment as the meter is revolved.

49. In a calculating-machine, a driving-shaft, an epicycle cylindrical meter without the driving-shaft and revolved by it, a toothed governor wheel carried by the driving-shaft, a shaft, a gear on the shaft having its teeth in mesh with the teeth of the governor wheel, and a fan governor on the shaft for regulating the speed of the driving-shaft, substantially as shown.

50. In a calculating machine, a revolving meter, a driving shaft for revolving the meter, a gear carried by the driving shaft, means for operating the meter, a shaft 222, an inwardly swinging segment 224, teeth 226 carried by the segment, a pinion in mesh with the teeth of the segment, gearing connecting the gear and pinion, and a series of multiplying keys for determining the inward movement of and operating the segment whereby the number of revolutions of the driving shaft is controlled.

51. In a calculating machine, a meter, operating means for the meter, means for revolving the meter successively one or more times against the operating means, means for automatically moving the meter one position longitudinally of the calculating machine after each series of revolutions, a key, levers operated by the key and means connecting the levers and meter for preventing its longitudinal movement after each series of revolutions.

52. In a calculating machine, a cylindrical revolving meter, a series of toothed segments, means for revolving the meter against the segments, a finger bar 188, a shaft 195, a lever 194 on the shaft and operated by the finger bar, a plate 228 preventing when in its normal position the operation of the means for revolving the meter, and a lever 196 carried by the shaft for moving the plate out of its normal position.

53. In a calculating machine, a cylindrical revolving meter, a series of toothed segments, means for revolving the meter successively as many times as desired against the segments, means for automatically moving the meter one position longitudinally of the calculating machine after each series of revolutions, a lever 210 which operates when displaced out of its normal position to prevent the longitudinal movement of the meter, and means for automatically throwing the lever 210 out of its normal position on each revolution of the meter.

54. In a calculating machine, a cylindrical revolving meter, means for revolving the meter, means for operating the meter as it is revolved, a rock-shaft 246, spring pressed latches 263 for controlling the movement of the meter from left to right, a trip pawl 259 on the rock-shaft for operating the latches, a lever 244 for rocking the rock-shaft, a finger key 230 and means connecting the finger key and lever 244 whereby the lever is operated.

55. In a calculating machine, a cylindrical revolving meter, a diving shaft for revolving the meter, means for operating the meter as it is revolved, a rock-shaft, spring pressed latches for controlling the movement of the meter from left to right, a trip pawl 259 on the rock-shaft for operating the latches, a lever 244 provided at its upper end with a curved nose 247, a bar 228, fingers 249 and 250 carried by the bar, an arm 229 on the driving shaft, a detent 251 on the arm normally resting upon the finger 250 and preventing motion of the arm and driving shaft, means for moving the bar 228 and allowing the driving shaft to revolve, a spring pressed pawl 253 adapted when the arm is freed to pass over the top of the nose of the lever and when the detent 251 strikes upon the finger 250 to force the arm to rock the rock-shaft and allow a sidewise movement of the meter from left to right.

56. In a calculating machine, a cylindrical revolving meter provided with several numeral wheels, means for operating the meter, a shaft 99, carry-up arms 101 on the shaft, a spring pressed plate 152 on the shaft, a spring pawl 157 carried by the plate, a lever 168, means whereby upon backward movement of the lever the pawl and its plate will be forced backward rocking the shaft and recocking the carry-up arms.

57. A calculating-machine consisting of an epicycle cylindrical meter having a number of numeral wheels, revolving means, adding keys operating means for rotating wheels of the meter when it is revolved, a key 188 for starting the revolving means in problems of addition, and independent multiplying keys for starting the revolving means and governing the number of revolutions in problems of multiplication, substantially as shown and for the purpose specified.

In testimony whereof I affix my signature in presence of two witnesses.

EMORY S. ENSIGN.

Witnesses:
CHARLES F. A. SMITH,
MELVA W. PORTER.